US007805719B2

(12) United States Patent
O'Neill

(10) Patent No.: US 7,805,719 B2
(45) Date of Patent: Sep. 28, 2010

(54) SYSTEM AND METHOD FOR UPDATING AND DISTRIBUTING INFORMATION

(75) Inventor: Patrick J. O'Neill, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1289 days.

(21) Appl. No.: 11/335,312

(22) Filed: Jan. 19, 2006

(65) Prior Publication Data

US 2006/0130046 A1      Jun. 15, 2006

Related U.S. Application Data

(63) Continuation of application No. 10/311,462, filed as application No. PCT/US01/44034 on Nov. 19, 2001.

(60) Provisional application No. 60/249,606, filed on Nov. 17, 2000.

(51) Int. Cl.
G06F 9/45          (2006.01)
(52) U.S. Cl. .................................................. 717/168
(58) Field of Classification Search .................. 717/168
See application file for complete search history.

(56) References Cited

U.S. PATENT DOCUMENTS

| 5,084,816 | A | 1/1992 | Boese et al. |
| 5,261,055 | A | 11/1993 | Moran et al. |
| 5,421,006 | A | 5/1995 | Jablon et al. |
| 5,442,771 | A | 8/1995 | Filepp et al. |
| 5,479,637 | A | 12/1995 | Lisimaque et al. |
| 5,579,522 | A | 11/1996 | Christeson et al. |
| 5,596,738 | A | 1/1997 | Pope |
| 5,598,531 | A | 1/1997 | Hill |
| 5,598,534 | A | 1/1997 | Haas |
| 5,608,910 | A | 3/1997 | Shimakura |
| 5,623,604 | A | 4/1997 | Russell et al. |
| 5,666,293 | A | 9/1997 | Metz et al. |
| 5,752,039 | A | 5/1998 | Tanimura |
| 5,778,440 | A | 7/1998 | Yiu et al. |
| 5,790,974 | A | 8/1998 | Tognazzini |

(Continued)

FOREIGN PATENT DOCUMENTS

CA          2339923        3/2000

(Continued)

OTHER PUBLICATIONS

Digital Cellular Telecommunications System (Phase 2+) At Command Set for GSM Mobile Equipment (ME) (GSM 07.07 verson 7.4.0 Release 1998), ETSI TS 100 916 V7.4.0 (Nov. 1999), 126 pages.

(Continued)

*Primary Examiner*—John Chavis

(57) ABSTRACT

The present invention discloses efficient devices, systems, and methods for updating digital information sequences that are comprised by software (110a), devices (104a), and data (110c). In addition, these digital information sequences may be stored and used in various forms, including but not limited to files, memory locations, and/or embedded storage locations. The disclosed invention is thus suitable for updating many types of digital information sequences and in the context of updating software comprised of multiple files. Furthermore, the devices, systems, and methods described herein provide a developer skilled in the art with an improved ability to generate update information as needed and, additionally, allow users to proceed through a simplified update path, which is not error-prone, and may be performed more quickly than through the use of existing technologies.

121 Claims, 17 Drawing Sheets

U.S. PATENT DOCUMENTS

| | | | |
|---|---|---|---|
| 5,845,077 A * | 12/1998 | Fawcett | 709/221 |
| 5,878,256 A | 3/1999 | Bealkowski et al. | |
| 5,960,445 A | 9/1999 | Tamori et al. | |
| 5,968,182 A | 10/1999 | Chen et al. | |
| 6,009,274 A * | 12/1999 | Fletcher et al. | 717/173 |
| 6,009,497 A | 12/1999 | Wells et al. | |
| 6,018,747 A | 1/2000 | Burns et al. | |
| 6,038,636 A | 3/2000 | Brown, III et al. | |
| 6,064,814 A | 5/2000 | Capriles et al. | |
| 6,073,206 A | 6/2000 | Piwonka et al. | |
| 6,073,214 A * | 6/2000 | Fawcett | 711/133 |
| 6,080,207 A | 6/2000 | Kroening et al. | |
| 6,088,759 A | 7/2000 | Hasbun et al. | |
| 6,105,063 A | 8/2000 | Hayes, Jr. | |
| 6,112,024 A | 8/2000 | Almond et al. | |
| 6,112,197 A | 8/2000 | Chatterjee et al. | |
| 6,126,327 A | 10/2000 | Bi et al. | |
| 6,128,695 A | 10/2000 | Estakhri et al. | |
| 6,138,249 A | 10/2000 | Nolet | |
| 6,157,559 A | 12/2000 | Yoo | |
| 6,163,274 A | 12/2000 | Lindgren | |
| 6,198,946 B1 | 3/2001 | Shin et al. | |
| 6,199,204 B1 | 3/2001 | Donohue | |
| 6,209,127 B1 | 3/2001 | Mori et al. | |
| 6,279,153 B1 | 8/2001 | Bi et al. | |
| 6,301,710 B1 | 10/2001 | Fujiwara | |
| 6,311,322 B1 | 10/2001 | Ikeda et al. | |
| 6,334,212 B1 | 12/2001 | Nakajima | |
| 6,343,379 B1 | 1/2002 | Ozawa et al. | |
| 6,357,021 B1 * | 3/2002 | Kitagawa et al. | 714/41 |
| 6,381,740 B1 | 4/2002 | Miller et al. | |
| 6,405,364 B1 * | 6/2002 | Bowman-Amuah | 717/101 |
| 6,408,434 B1 | 6/2002 | Fujiwara | |
| 6,438,585 B2 | 8/2002 | Mousseau et al. | |
| 6,526,574 B1 | 2/2003 | Jones | |
| 6,615,038 B1 | 9/2003 | Moles et al. | |
| 6,615,404 B1 | 9/2003 | Garfunkel et al. | |
| 6,668,336 B2 | 12/2003 | Lasser | |
| 6,725,056 B1 | 4/2004 | Moles et al. | |
| 6,725,392 B1 | 4/2004 | Frey et al. | |
| 6,832,373 B2 | 12/2004 | O'Neill | |
| 6,836,657 B2 | 12/2004 | Ji et al. | |
| 6,873,988 B2 | 3/2005 | Herrmann et al. | |
| 6,883,168 B1 * | 4/2005 | James et al. | 717/178 |
| 6,922,722 B1 | 7/2005 | Mann et al. | |
| 6,925,467 B2 | 8/2005 | Gu et al. | |
| 6,928,108 B2 | 8/2005 | Nelson et al. | |
| 6,944,621 B1 * | 9/2005 | Collart | 707/102 |
| 6,990,660 B2 * | 1/2006 | Moshir et al. | 717/171 |
| 7,058,978 B2 | 6/2006 | Feurstein et al. | |
| 7,106,843 B1 | 9/2006 | Gainsboro et al. | |
| 7,111,201 B2 | 9/2006 | Largman et al. | |
| 7,117,172 B1 | 10/2006 | Black | |
| 7,136,857 B2 | 11/2006 | Chen et al. | |
| 7,137,034 B2 | 11/2006 | Largman et al. | |
| 7,150,015 B2 | 12/2006 | Pace et al. | |
| 2001/0029178 A1 | 10/2001 | Criss et al. | |
| 2001/0042112 A1 * | 11/2001 | Slivka et al. | 709/220 |
| 2001/0047363 A1 | 11/2001 | Peng | |
| 2001/0048728 A1 | 12/2001 | Peng | |
| 2002/0072359 A1 | 6/2002 | Moles et al. | |
| 2002/0078209 A1 | 6/2002 | Peng | |
| 2002/0116261 A1 | 8/2002 | Moskowitz et al. | |
| 2002/0131404 A1 | 9/2002 | Mehta et al. | |
| 2002/0152005 A1 | 10/2002 | Bagnordi | |
| 2002/0156863 A1 | 10/2002 | Peng | |
| 2002/0157090 A1 | 10/2002 | Anton, Jr. | |
| 2003/0023964 A1 | 1/2003 | Rajaram et al. | |
| 2003/0027563 A1 | 2/2003 | Herle et al. | |
| 2003/0033599 A1 | 2/2003 | Rajaram et al. | |
| 2003/0037075 A1 | 2/2003 | Hannigan et al. | |
| 2003/0061384 A1 | 3/2003 | Nakatani | |
| 2003/0074658 A1 | 4/2003 | Kim | |
| 2003/0084435 A1 | 5/2003 | Messer et al. | |
| 2003/0121032 A1 | 6/2003 | Cho et al. | |
| 2003/0162533 A1 | 8/2003 | Moles et al. | |
| 2003/0182414 A1 | 9/2003 | O'Neill | |
| 2003/0186689 A1 | 10/2003 | Herle et al. | |
| 2004/0015952 A1 | 1/2004 | Lajoie et al. | |
| 2004/0031031 A1 | 2/2004 | Rudelic | |
| 2004/0034853 A1 | 2/2004 | Gibbons et al. | |
| 2004/0054995 A1 | 3/2004 | Lee | |
| 2004/0111723 A1 | 6/2004 | Moles et al. | |
| 2004/0117785 A1 | 6/2004 | Kincaid | |
| 2004/0133887 A1 | 7/2004 | Herle et al. | |
| 2004/0152455 A1 | 8/2004 | Herle | |
| 2004/0261072 A1 | 12/2004 | Herle | |
| 2004/0261073 A1 | 12/2004 | Herle et al. | |
| 2005/0060699 A1 | 3/2005 | Kim et al. | |
| 2005/0097544 A1 | 5/2005 | Kim | |
| 2005/0144609 A1 | 6/2005 | Rothman et al. | |
| 2005/0144612 A1 | 6/2005 | Wang et al. | |
| 2005/0160195 A1 | 7/2005 | Bruner et al. | |
| 2005/0216902 A1 | 9/2005 | Schafer | |
| 2005/0216903 A1 | 9/2005 | Schafer | |

FOREIGN PATENT DOCUMENTS

| | | |
|---|---|---|
| EP | 0717353 | 6/1996 |
| JP | 7160490 | 6/1995 |
| JP | 7219780 | 8/1995 |
| JP | 8202626 | 8/1996 |
| JP | 8255104 | 10/1996 |
| JP | 11003223 | 1/1999 |
| JP | 11272454 | 10/1999 |
| JP | 11345127 | 12/1999 |
| KR | 20020034228 | 5/2000 |
| KR | 20010100328 | 11/2001 |
| WO | 9632679 | 10/1996 |
| WO | 9856149 | 12/1998 |
| WO | PCT US01 44034 | 11/2001 |

OTHER PUBLICATIONS

"Notice of Reasons for Rejection", Japanese Office Action Reference No. B027803, Mailing No. 415807, Mailing Date Nov. 8, 2005 for Patent Application No. 2002-543291, with English Translation, pp. 1-13.

"Transcript of Decision of Final Rejection", Japanese Office Action Reference No. B027803, Mailing No. 236268, Mailing Date Jun. 6, 2006 for Patent Application No. 2002-543291, with English Translation, pp. 1-10.

Computer Dictionary, Microsoft Press, Third Edition, pp. 88, 190, (1997).

Muller, Nathan J., "Focus on OpenView A Guide to Hewlett-Packard's Network and Systems Management Platform", (1995), CBM Books, pp. 1-291.

Jing, J., et al., "Client Server Computing in Mobile Environments", ACM Computing Surveys, (Jul. 1999), pp. 117-159, vol. 31, Issue 2, ACM Press.

Hadjiefthymiades, S. et al., "ESW4: enhanced scheme for WWW computing in wireless communication environments", ACM SIGCOMM Computer Communication Review (Oct. 1999), pp. 24-35, vol. 29, Issue 5, ACM Press.

Sevanto, J. et al., "Introducing quality-of-service and traffic classes in wireless mobile networks", Proceedings of the 1st ACM International workshop on Wireless mobile multimedia (1999), pp. 21-29, ACM Press.

Fasbender, A. et al., "Any Network, Any Terminal, Anywhere", IEEE Personal Communications (Apr. 1999), pp. 22-30, IEEE Press.

EP Search Report dated Mar. 6, 2009.

* cited by examiner

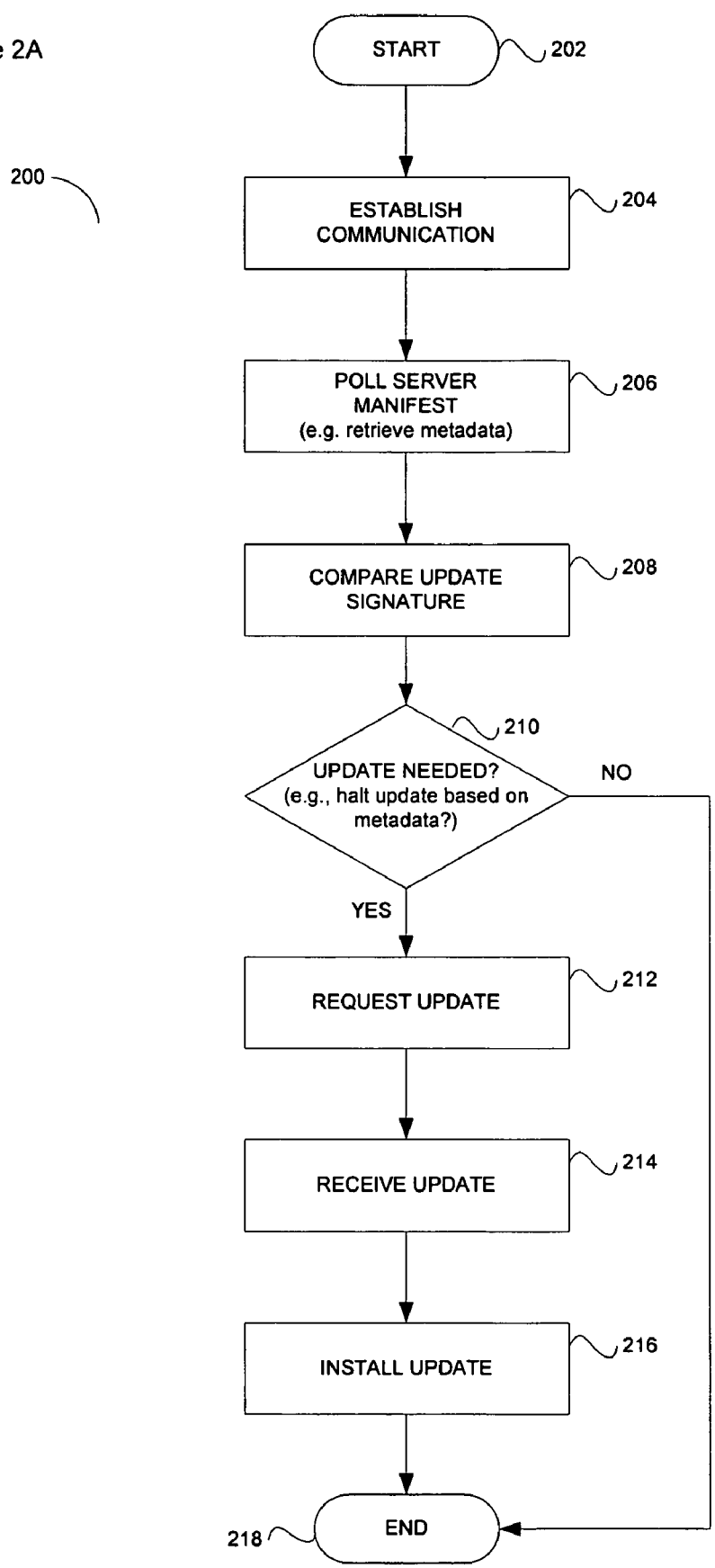

SYSTEM AND METHOD FOR UPDATING AND DISTRIBUTING INFORMATION

RELATED APPLICATIONS

This patent application is a Continuation Application of U.S. patent application Ser. No. 10/311,462 entitled "SYSTEM AND METHOD FOR UPDATING AND DISTRIBUTING INFORMATION", filed Dec. 13, 2002, having a 371(c) date of May 13, 2003, which is a national phase filing based on a PCT application number of PCT/US01/44034, filed Nov. 19, 2001, which in turn claims priority to U.S. Provisional Patent Application Ser. No. 60/249,606 filed Nov. 17, 2000, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

1. Field of the Invention

The present invention generally relates to information updating systems, and more particularly, to a software system and method for updating information which reduces the size of an update and distributes the update in a platform independent manner.

2. Description of the Related Art

With the rapid and continuous advancement of software and hardware technology, maintenance of existing devices and software components presents an ever-increasing challenge. Routine installation of information updates and patches has become a recognized necessity to insure that computers, devices, and software applications are kept fully functional over their operational lifetimes. Unfortunately, for many devices and applications, update management can be a cumbersome, time consuming, and error prone process. These problems are often exacerbated in portable electronic devices such as cellular phones and personal digital assistants due to memory constraints and bandwidth restrictions. Furthermore, portable electronic devices often lack the ability to perform automated update operations in a convenient and reliable manner. As a result, there is an ongoing need for improved update processes that can be used in conjunction with both hardware and software systems. Furthermore, there is a need for an update methodology that reduces the size of the update package to help alleviate potential problems that arise due to memory constraints and bandwidth limitations.

Increased sophistication of updateable electronic devices and software often necessitates frequent maintenance where updates are made available and desirably applied on weekly or monthly basis. During the update process, problems often arise when the update is improperly performed or interrupted and may result in data corruption, loss of program functionality, or hardware failure. This presents developers and consumers alike with significant obstacles to insure that available updates are installed in a timely and effective manner. Additionally, developers must dedicate a substantial amount of time and resources to insure their users are provided with necessary updates, patches, and new versions of existing software and/or hardware components.

Some of the concerns which the developer must address include the substantial amount of resources required to store and provide updates to a large customer base, technical support issues related to helping customers properly apply the updates, and the methods by which the updates are distributed to the customers in a timely and efficient manner. A further problem exists where a high degree of requisite skill is needed to acquire and install an available update and may involve technical skills beyond that of the average customer. Even if a customer is able to retrieve the update, he is faced with the problem of insuring its proper installation. Improper installation of an update package may result in software failure or render the device to which the update is applied inoperative and place a further burden on the developer in resolving customer-related update problems. With increased dependence on electronic devices having updateable components, there is a need for faster and more intuitive updating capabilities and smaller update file sizes to insure that updates can be readily retrieved and properly installed as necessary or desired. In many instances, the ease, reliability, and availability of an update package can significantly affect customer number and loyalty and is a distinguishing characteristic for a successful developer or merchant.

Although the importance of a superior updating system is apparent, conventional updating solutions typically suffer from a number of drawbacks. These problems are particularly prevalent in portable electronics devices and arise from a number of factors related to creation, distribution, and installation of the update package. For example, electronic devices such as cellular phones are often limited with respect to the available memory or storage space available for update processing. The size of the update package must be kept to a minimum in order to accommodate the reduced availability of resources on these devices and, as a result, the ability to perform significant alterations or modifications of the embedded code in these devices may be limited. Furthermore, conventional update methods for portable electronic devices which are directed towards complete operating system replacement or maintenance require the device to be physically connected by a wired connection to a dedicated apparatus which applies the update. Updating in this manner requires specialized hardware and necessitates the device to be updated to be returned to the manufacturer or a suitable service location. This is inconvenient for the user and may not be practical when the number of devices to be updated is large.

In devices that support wireless acquisition and installation of update packages, problems are frequently encountered due to bandwidth limitations needed to distribute available update packages. Furthermore, acquisition of the update package by wireless methods may take long periods of time and be subject to interruption or data corruption. Even when the update package has been acquired, the installation of the update often requires significant technical expertise at the user end complicating the proper installation of the update package. During this time the user may be faced with problems associated with uninstalling a previous version of the code to be updated or applying the update in manner that will be successful. This can present a further problem as it discourages the user from performing update operations for long periods of time or in some cases altogether.

A further problem exists with update management systems that rely on publicly accessible servers to provide updates to large number of users. These servers often become busy or crowded and reduce the efficiency by which the update can be acquired. Additional complexities resulting from update requirements arise from shortened product version lifecycles. It is not uncommon for new software releases to be available every few months (or even weeks, in the case of 'bug fixes' and intra-version updates). This places increased demands on developer resources required to maintain the update services and results in developers expending added resources for existing software maintenance potentially shifting their focus from developing new product capabilities to supporting and updating older versions. From a business perspective software updating is generally recognized as a non-revenue producing activity and may consume an inordinate percentage of developer resources. Therefore there is an ongoing need to reduce the time, resources, and personnel needed to service existing software while at the same time insuring the customers are presented with the most up-to-date software versions.

Attempts to make updates faster and more intuitive have led to the development of internally-designed and supported update solutions. A number of problems are associated with these solutions which are typically expensive, proprietary, and platform-specific. Other methods for update creation use commercial software packages designed to create updates or to generate patches for software. Both of these methods have inherent problems with flexibility and file size. Commercially available software updaters can be expensive and typically create updates which have unnecessarily large file sizes. In some instances, the new version or update generated by the updater is actually a full version of the software rather than an actual patch. Because of the problems associated with large update file sizes, developers may be hesitant to release frequent patches and as a result, pursue longer software development cycles. This may be a disservice to the customer due to the limited number of updates, which may be released only when there are substantial enough changes and/or improvements to warrant the creation and disbursement of large update files.

From the foregoing, it can be appreciated that there is an ongoing need for a convenient and reliable update management system. To this end, there is a need for a system which generates and distributes updates that are of reduced size to allow for more rapid acquisition. Additionally there is a need for an automated process that provides a convenient trouble-free method for installing desired updates to both hardware and software systems alike.

BRIEF SUMMARY OF THE INVENTION

The present invention satisfies aforementioned needs for efficient updating of digital information sequences that comprise software, devices, and data. Further, these digital information sequences may be stored and used in various forms, including but not limited to files, memory locations, or embedded storage locations. The system and methods described herein provide a developer with an improved ability to create update information as needed and additionally allow users to proceed through a simplified update path which is not error-prone and can be performed more quickly than through the use of existing technologies.

In one embodiment the invention comprises a system for updating a plurality of distributed electronic devices with an updated operating code comprising a first plurality of digital information sequences wherein each of the plurality of electronic devices include a resident operating code comprising a second plurality of digital information sequences that are stored within the electronic device. The system further comprises an update generator that compares an image of the first plurality of digital information sequences comprising the updated operating code to an image of the second plurality of digital information sequences comprising the resident operating code and identifies differences between of the updated operating code and the resident operating code and thereafter generates an update package comprising an instruction set which specifies how to generate the updated operating code utilizing at least a portion of the second plurality of digital information sequences of the resident operating code. The system further comprises a distribution system that distributes the update package to the electronic devices such that the update package is received by the electronic devices and stored therein. The system further comprises a plurality of client modules that are respectively resident on each of the plurality of electronic devices, wherein the plurality of client modules access the distribution system and receive the update package and wherein the instruction set of the update package is executed by the client modules so as to generate the updated operating code by utilizing a least a portion of the second plurality of digital information sequences from the resident operating code.

In another aspect the invention comprises a system for updating an electronic device containing a first plurality of data sequences comprising a first code version to a second code version comprising a second plurality of data sequences using a update package comprising a plurality of transformation instructions which transform the first code version into the second code version. The system further comprises an update generator that performs a version comparison between the first code version and the second code version to identify pattern differences between the first plurality of data sequences and the second plurality of data sequences, wherein the identified pattern differences are encoded using the transformation instructions which identify portions of the first plurality of data sequences that can be used in the construction of the identified pattern differences, and thereafter forming the update package using the transformation instructions. The system further comprises a distribution system that receives the update package from the update generator and distributes the update package to the electronic device. The system further comprises an update agent resident on the electronic device that executes the transformation instructions of the update package thereby transforming the first code version resident in the electronic device into the updated second code version.

In yet another aspect the invention comprises a system for updating a plurality of distributed electronic devices with an updated operating code that comprises a plurality of data blocks wherein each of the plurality of distributed electronic devices include a resident operating code that is stored as plurality of data blocks. The system further comprises an update generator that compares the plurality of data blocks of the resident operating code with the plurality of data blocks of the updated operating code and thereby generates an update package comprising an instruction set which indicates how to generate the updated operating code utilizing at least in part the plurality of data blocks of the resident operating code. The system further comprises a distribution system that includes the update package and is accessible by each of the plurality of distributed electronic devices. The system further comprises a plurality of client modules that are respectively resident on each of the plurality of distributed electronic set, wherein the plurality of client modules accesses the distribution system so as to be able to receive the update package, wherein the instruction set provides instructions to the client modules such that the client modules generates at least a portion of the plurality of data blocks comprising the updating operating code by utilizing the plurality of data blocks comprising the resident operating code.

In still another aspect the invention comprises a system for updating a plurality of distributed electronic devices with an updated operating code that comprises a plurality of data blocks wherein each of the plurality of distributed electronic devices include a resident operating code that is stored as plurality of data blocks. The system further comprises an update generator that compares the plurality of data blocks of the resident operating code with the plurality of data blocks of the updated operating code and thereby identifies update data blocks that are different between the update operating code and the resident operating code wherein the update generator generates an update package comprising an instruction set which indicates how to transform the resident operating code into the updated operating code and how to generate the update data blocks utilizing at least in part the plurality of data blocks of the resident operating code. The system further comprises a distribution system that includes the update package and is accessible by each of the plurality of distributed electronic devices. The system further comprises a plurality of client modules that are respectively resident on each of the plurality of distributed electronic set, wherein the plurality of client modules accesses the distribution system so as to be able to receive the update package, wherein the instruction set provides instructions to the client modules such that the client modules modifies the resident operating code into the updated operating code and wherein the client modules generates at least a portion of the update data blocks by utilizing the received instruction set to perform operations on the data blocks of the resident operating code to generate the update data blocks.

In a further embodiment the invention comprises a method of updating a resident operating code stored in a first storage section of an electronic device into an updated operating code. The method further comprises the step of developing an update package comprising a plurality of transformation operations to transform the resident operating code into the updated operating code. The method further comprises the step of transferring the update package to the electrical device. The method further comprises the step of copying a portion of the resident operating code into a second storage section. The method further comprises the step of updating the portion of the resident operating code stored in the second storage section using the transformation operations of the update package to transform the resident operating code into updated operating code. The method further comprises the step of replacing the portion of resident operating code stored in the first storage section with the portion of updated operating code stored in the second storage section. The method further comprises the step of repeating steps of copying, updating, and replacing noted above until the resident operating code has been fully updated to the updated operating code.

In a still further embodiment the invention comprises an updatable electronic device comprising a non-volatile storage section having operating code stored therein, a volatile storage section that is adapted to receive an update package comprising a plurality of instructions via a communications medium, and a controller that implements the instructions of the update package to update the operating code stored in the non-volatile storage section. In this embodiment the controller is configured to sequentially (i) retrieve original portions of operating code from the non-volatile storage section into the volatile storage section and (ii) apply the instructions of the update package to the retrieved portions in the volatile storage section to thereby transform the retrieved original operating code portion into an updated operating code portion and then (iii) replace the original operating code portion with the updated operating code portion.

BRIEF DESCRIPTION OF SEVERAL VIEWS OF THE DRAWINGS

These and other aspects, advantages, and novel features of the invention will become apparent upon reading the following detailed description and upon reference to the accompanying drawings. In the drawings, similar elements have similar reference numerals.

FIG. 2A is a flowchart illustrating one embodiment of an update installation process.

DETAILED DESCRIPTION OF THE INVENTION

Figure 1A:
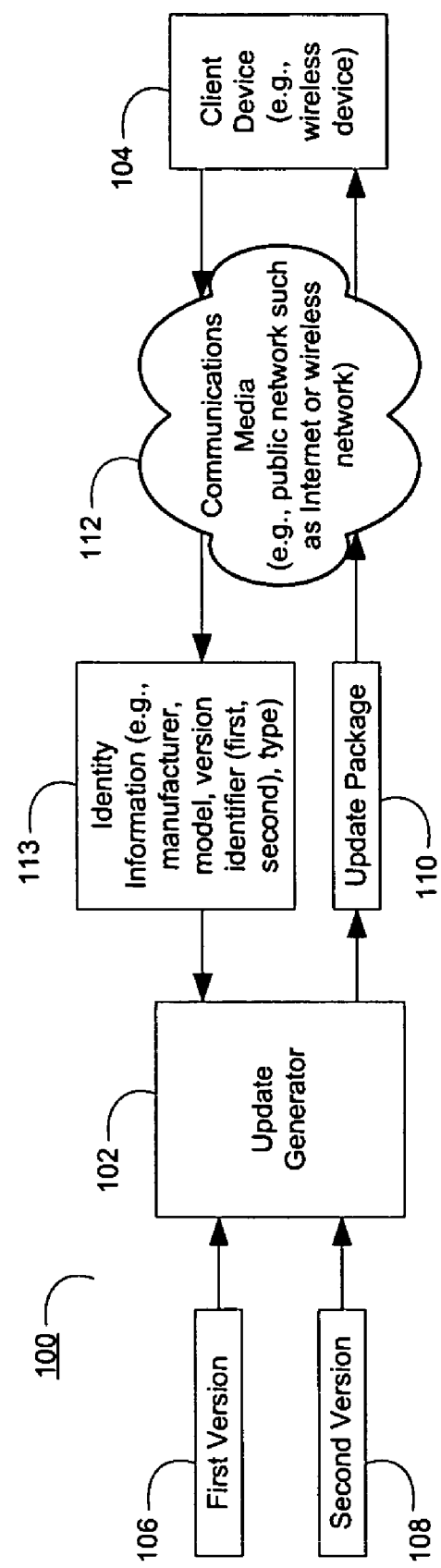
FIG. 1A is a block diagram illustrating one embodiment of an update management and distribution system.

Reference will now be made to the drawings wherein like numerals refer to like parts throughout. FIG. 1A illustrates one embodiment of an update distribution system 100. The update distribution system 100 includes an update generator 102 and a client device 104. In one embodiment, the update generator 102 receives a first code version 106, such as an old version of a software application, and a second code version 108, such as a new version of a software application. The update generator 102 produces an update package 110 comprising an instruction set which represents a plurality of operations that are desirably used to transform the first original code version 106 into the second updated code version. The update package 110 is then transferred to a client device 104 via a communications medium 112. Viable choices for communications media 112 may include hardwired media, removable storage media, wireless media, volatile and non-volatile memory based media, and the Internet. Other communications media 112 may include by way of example, local area networks (LANs), wide area networks (WANs), public Internets, private Internets, a private computer network, a secure Internet, a private network, a public network, a value-added network, interactive television networks, wireless data transmission networks, two-way cable networks, interactive kiosk networks, and the like. In addition, the client device 104 may comprise numerous types of devices capable of receiving and processing the update package 110, such as computers, personal digital assistants (PDAs), hardwired phones, mobile phones, pagers, electronic peripheral devices, appliances, and other such devices capable of being configured to receive the update package.

In one aspect, the instruction set utilizes a conversion process employed by the client device 104 to efficiently convert the existing first code version 106 to the second code version 108. The instruction set and the implementation of the conversion process will be discussed in greater detail herein below.

At least one method by which the client device 104 may securely and reliably obtain the update package 110 from the update generator 102 may occur by transfer of information in the form of the update package 110 through at least one of the above-mentioned communications media types. The client device 104 may further be equipped with the capability to bi-directionally communicate with the update generator 102. In one embodiment, the client device 104 transfers identity information 113, including type, model, and/or make of the device, as well as the version of operational software or applications currently in use by the client device 104. The update generator 102 receives the identity information 113 from the client device 104 and subsequently generates the desired update package 110 required and/or requested by the client device 104. Alternatively, the update generator 102 may be equipped with the ability to generate and provide a plurality of update packages 110, which reference a plurality of operational software versions or applications, prior to receiving the identity information 113. In this embodiment, the update generator 102 may retrieve from memory or storage an archived version of the desired update package 110a. In addition, the update generator 102 may create a version manifest, which comprises a list of archived update packages 110 including operational software version information for a wide range of particular client devices 104. Once the update package 110 is generated, validated, and deemed available, the update generator 102 may function as a server and transfer the desired update package 110 to the client device 104 as requested or required. It will be appreciated that one or more update packages 110 may be generated and archived as updated versions of operational software become available. Furthermore, update packages 110 can be prepared for use with hardware update systems, such as may be required, for example, to update non-volatile memory components or portable electronic devices. One desirable feature of the update management system is that it may be readily adapted for use in wireless update procedures or over the air (OTA) updating.

This method allows updates for software or firmware components in devices without hardware changes. The updating methods described herein can further be used to update a client device including applications, operational functionality, operating system software and the like. Furthermore, the updating operations can correct errors or problems with existing code resident in the device, add new features or functionality, change or modify resident applications, or perform other desired update operations in a manner that will be described in greater detail herein below.

In one embodiment, the update generator 102 comprises a single computing device or server component which is responsible for both generating and distributing update packages 110. The update generator 102 is equipped to run specialized software to construct the instruction set of the update package 110 for the client device 104. Moreover, the update generator 102 creates the update package 110 by comparing the first code version 106 to the second code version 108. The update package 110 desirably includes mathematical operations and instructions coded into the instruction set which transform the first code version 106 into the second code version 108. A principle feature of the update management system is that update packages 110 are generated in such a way so as to utilize existing code or information resident on the device. The methods for update package generation are specifically designed to analyze the differences between the code versions 106,108 and make use of existing information sequences in the device when possible to transform the first code version 106 into the second code version 108. This feature is significant in that it significantly reduces the size of the update package compared to conventional methods. In one aspect, the file size of the update package 1107 may be reduced by more than 90 percent with respect to the first code version 106. Advantageously, since the file size of the update package 110 is relatively small and compact, the update package 110 may be easily transferred and stored in a memory component of the client device 104 without significantly altering the memory allocation size and bandwidth specifications of the client device 104. In one aspect the update generator 102 generates and archives a plurality of update packages 110 for distribution to one or more different types of client devices 104. Each client device 104 may then request transfer of the desired update package 110 which is selectively sent by the server.

Figure 1B:
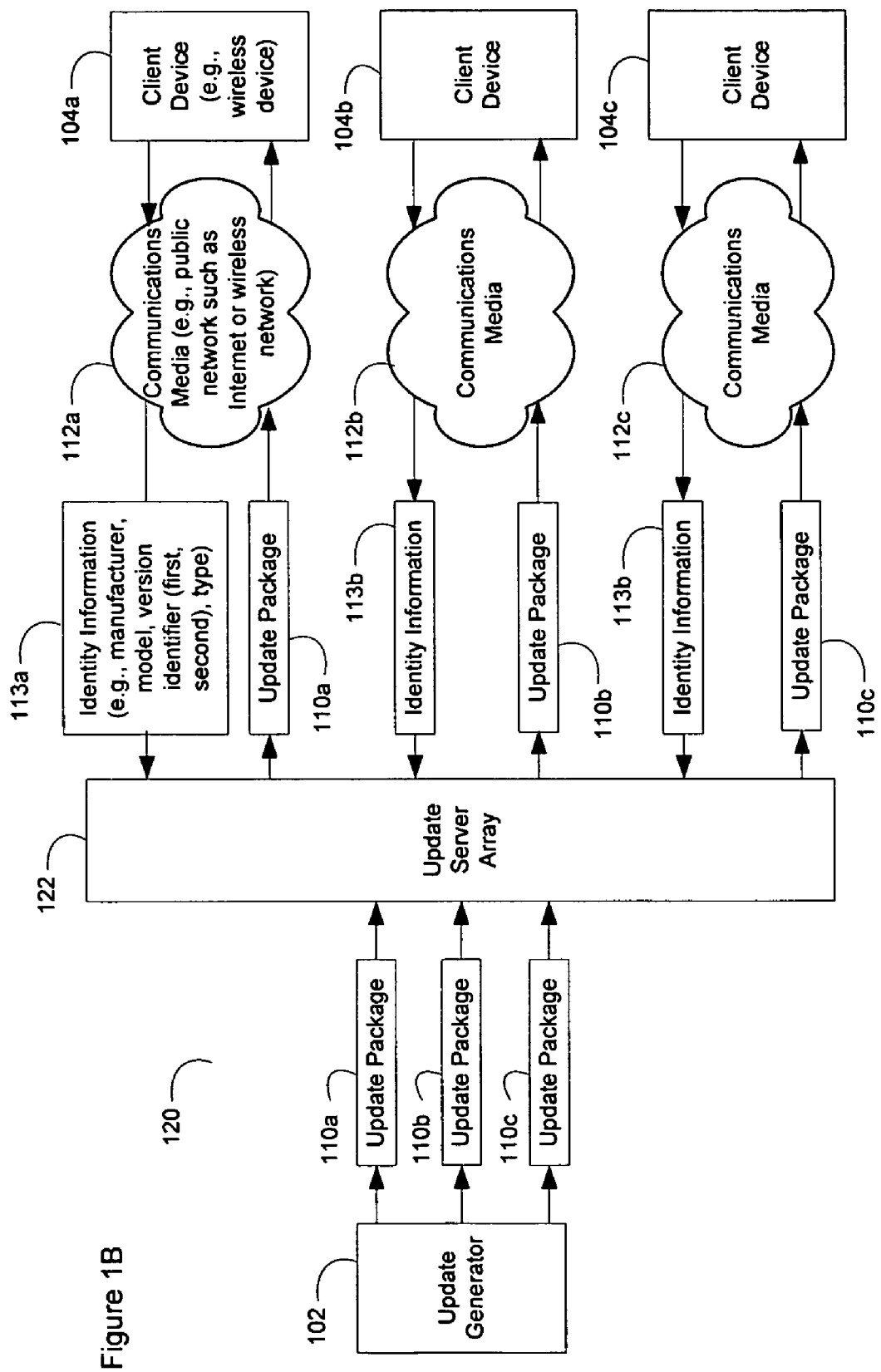
FIG. 1B is a block diagram illustrating another embodiment of an update management and distribution system including an update server array.

FIG. 1B illustrates another embodiment of an update distribution system 120. The update distribution system 120 is similar in scope and functionality to the update distribution system 100 of FIG. 1A except that the update distribution system 120 is illustrated with separate computing components including an update server array 122. The update distribution system 120 includes the update generator 102, the update server array 122, and a plurality of client devices 104a, 104b, 104c. In this particular embodiment, the update generator 102 is shown to generate the plurality of update packages 110a, 110b, 110c and transfer the plurality of update packages 110a, 110b, 110c to the update server array 122. Additionally, the update server array 122 subsequently transfers the plurality of update packages 110a, 110b, 110c to the plurality of client devices 104a, 104b, 104c via communication media 112a, 112b, 112c where the communication media 112a, 112b, 112c may correspond, for example, to the communication media 112 of FIG. 1A.

In one aspect, the update server array 122 comprises one or more computing devices, which may be configured to store and archive the plurality of update packages 110a, 110b, 110c transferred from the update generator 100. Storage components include, but are not limited to, hard drives, magnetic tape drives, random access memory (RAM), read only memory (ROM), and removable RAM and/or ROM-based storage media including compact discs, floppy disks, magnetic tape. Additionally, the update server array 122 may be equipped with the capability to independently and bi-directionally communicate with the plurality of client devices 104a, 104b, 104c, wherein the update server array 122 receives identity information 113a, 113b, 113c, including, type, model, and make of the device, and version of operational software or firmware currently in use on client devices 104a, 104b, 104c. In addition, the client devices 104a, 104b, 104c may request update packages 110a, 110b, 110c as needed or desired.

In one aspect, the update server array 122 receives the identity information 113a, 113b, 113c from individual client devices 104a, 104b, 104c along with a request for transfer of a specified update package 110a, 110b, 110c. The update server array 122 subsequently locates the requested archived update packages and transfers the requested update package to the client device. The update server array 122 may further automatically transfer the update package 110 to the client device 104 without a request from the client device 104.

Advantageously, the update server array 122 may coordinate the transfer of a plurality of update packages 110a, 110b, 110c to the plurality of client devices 104a, 104b, 104c through at least one of the various above-mentioned communication media types for the purpose of increased flexibility and efficiency of update distribution. After receiving the identity information 113a, 113b, 113c from at least one of the plurality of client devices 104a, 104b, 104c, the update server array 122 retrieves from memory or storage archive the required version of the update packages 110a, 110b, 110c and subsequently transfers the desired update package 110a, 110b, 110c to the particular client device 104a, 104b, 104c. In one embodiment, the update server array 122 may automatically transfer the update packages 110a, 110b, 110c to the client devices 104a, 104b, 104c without a request from the client devices 104a, 104b, 104c.

Alternatively, the update server array 122 may create a server manifest comprising a list of archived update packages 110a, 110b, 110c including operational software version information, which pertain to a wide range of particular client devices 104a, 104b, 104c depending on the identity, make, and model of the client devices 104a, 104b, 104c. Upon recognition of one or more client devices 104a, 104b, 104c, the update server array 122 may transfer the server manifest to the one or more client devices 104a, 104b, 104c. The one or more client devices 104a, 104b, 104c then review the manifest and submit a request for the update package 110a, 110b, 110c to be transferred from the update server array 122 to the one or more client devices 104a, 104b, 104c making the request.

In another aspect, the update package 110 may be sent from the update generator 100 to the update server array 122 through at least one of the above-mentioned communications media 112, which promotes increased availability of the update packages 110a, 110b, 110c to the one or more client devices 104a, 104b, 104c. In one embodiment, the update server array 122 is a multi-platform computing device capable of conveniently storing a plurality of update packages 110a, 110b, 110c for the various client-based devices 104a, 104b, 104c and independently establishes communication with each client device 104a, 104b, 104c. The update server array 122 may recognize the one or more client devices 104a, 104b, 104c to determine the required and/or desired update packages 110a, 110b, 110c needed by the one or more client devices 104a, 104b, 104c. For example, the update package 110 may be sent to the client device 104 and further processed by the client device 104 using software components capable of decoding the update package 110 and altering the operational software components designed and designated to be updated and/or converted. Aspects of the client side update process will be discussed in greater detail herein below. Although illustrated as separate computing components in FIG. 1B, it will be appreciated that the update server array 122 and update generator 102 may comprise a singular entity with the necessary scope and functionality to serve as both the update server array 122 and the update generator 102.

In another embodiment, the update computing architecture of the update server array 122 includes an additional component referred to as a collector, which collects information and updates for other devices capable of being updated using at least one of the update packages 110a, 110b, 110c generated by the update generator 102. In this particular embodiment, the collector may communicate with both the update server array 122 and the one or more client devices 104a, 104b, 104c to determine which client devices 104a, 104b, 104c require updating and if any updates are available. The collector may additionally acquire the necessary updates and, at that time or at a later time, distribute them to the client devices 104a, 104b, 104c. In this manner, the large numbers of client devices 104a, 104b, 104c may be subsequently updated in such a way to distribute the bandwidth requirements over the update server array 122. Additionally, the update packages 110 may be scheduled for delivery at various times to stagger the distribution load so that the servers are not overrun by simultaneous update requests from large numbers of client devices.

In one aspect, this method of distributing updates comprises caching the information on one or more servers to scale down network traffic. Using this method, the 'latest' update files can be stored on the servers and the update packages can be downloaded from the device servers directly by client/server communications without the need for additional communication between the server and the update store 133 or the update generator 102.

Figure 1C:
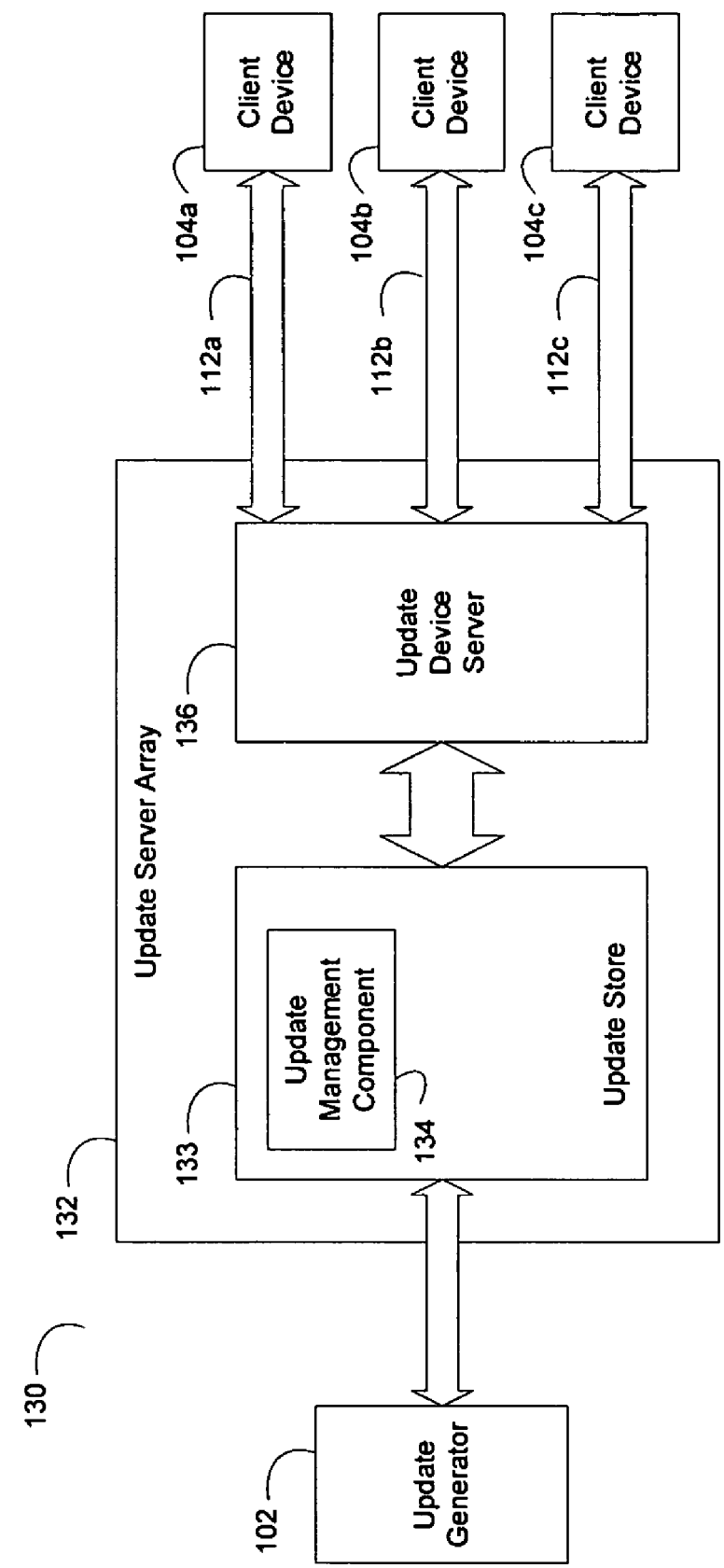
FIG. 1C is a block diagram illustrating another embodiment of an update management and distribution system including an update server array having an update store and an update device server.

FIG. 1C illustrates still another embodiment of an update distribution system 130. The update distribution system 130 includes the update generator 102, the plurality of client devices 104a, 104b, 104c, and a component version of the update server array 132 that was previously illustrated in FIG. 1B. As in FIG. 1A and 1B, the update server array 132 and client devices 104a, 104b, 104c, may communication via communication media 112a, 112b, 112c, respectively. The communication media 112a, 112b, 112c may correspond, for example, to communication media 112 of FIG. 1A. The component version of the update server array 132 further comprises an update store 133, having a management component 134, and at least one update device server 136. In one aspect, the update store 133 archives a plurality of update packages transferred from the update generator 102.

In many circumstances, operational software systems require periodic updates from older versions to newer versions. In addition, multiple updated versions of operational software may be required throughout the life of a client device for reasons of adapting to advances in computing technology. To satisfy these requirements, the update generator 102 generates update packages as newer versions of operational system software become available and then transfers the plurality of update packages to the update store 133 for storage and archiving in a memory or storage component.

In an exemplary application, the update management system may be used in conjunction with over the air updating of portable electronic devices, such as cellular or mobile phones.

Mobile communications technology is a rapidly changing field which strives to meet the rising demands and expectations of its users. Mobile phones are also micro-computing devices utilizing integrated operational system software. The operating software, throughout the life of the mobile phone, may require periodic software updates for increased adaptability to changes in wireless communications technology. Updating in the mobile communications industry is complicated by the presence of many different manufacturing entities with each having their own operational software systems and user functionality being integrated into various makes and models of mobile phones. In this circumstance, the update generator 102 is capable of meeting the adaptive demands of industry by generating a proper update package 110a, 110b, 110c relative to the newer versions of operational software onboard the client devices 104a, 104b, 104c, which pertain to the particular manufacturer's make and model of the mobile communications device.

Client-Side Update Determination

In one aspect, the client device 104 establishes a communication link with the update store 133 and transfers identity information 113 including, type, model, and make of the device, and code version currently being used by the client device 104. The update store 133 responds by transferring the server manifest, to the client. As previously described the server manifest contains version information describing available update packages. Furthermore, the server manifest may describe the update package characteristics such as file size so that the client can determine if enough space is available in the client storage area to receive and unpack the update package. After comparing the available code versions described in the server manifest to the onboard code version found in the client device 104, further a request for the appropriate update package 110 may be submitted by the client device 104. Upon receive the request the update store 133 references and searches for the desired update package 110, which corresponds to the correct instruction set for proper conversion of the older code version to the requested newer code version. In one more aspect, the update store 133 receives the request submission, and the update management component 134 processes the request submission, and locates the desired update package 110 on the update store 133 or the update device servers 136. Once the particular update package 110 has been located, the update management component 134 references the desired update package 110 and directs the update device server 136 to establish a communication link with the client device 104 to transfer the desired update package 110 to the client device 104.

Server-Side Update Determination

In another embodiment, the client device 104 establishes a communication link with the update device server 136 and transfers identity information 113 including, type, model, and/or make of the device, as well as version of operational system software currently being used by the client device 104. The update device server 136a analyzes the identity information and checks the server manifest or queries the update store 133 for the presence of the update package 110. After comparing the available versions of operational software on the server manifest or update store 133 to the onboard version of operational software transferred by the client device 104, the update store 133 directs the transfer of the update package 110 to the client device 104.

In one aspect, the update package 110 is transferred from the update store 133 to the update device server (s) 136 for distribution to client devices 104 as requested. In this case, the update device server (s) 136 acts as gateways which transfer the update packages 110 to clients as requested by the update store 133. Use of the update device server (s) 136 desirably improves load balancing and reduces bandwidth limitations imposed by having many client devices 104 connected to the same update package provider.

In one aspect, if the particular update package 110 that is requested or determined to be required by the client device 104 is not available in the update store 133, then the update management component 134 may transfer a request to the update generator 102 to generate the particular update package 110. Once the update package 100 is generated, the update generator 102 transfers the update package 110 to the update store 133 for storage and request servicing. After saving the update package 110 in the memory or storage area of the update store 133, the update management component 134 may transfer the desired update package 110 to the update device server 136. Subsequently, the update device server 136 may establish communication with the client device 104b and transfer the requested update package to the client device 104.

Figure 1D:
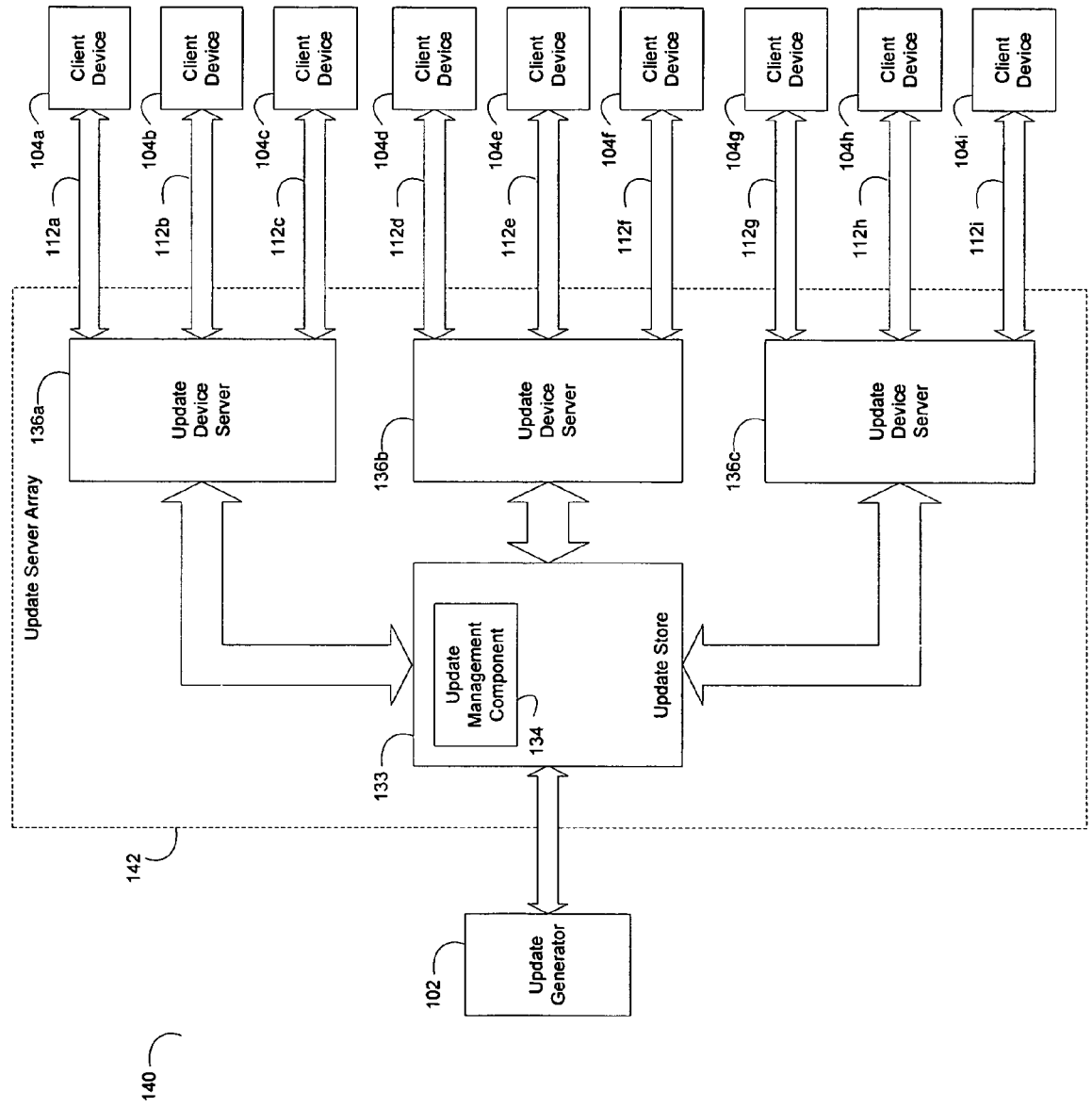
FIG. 1D is a block diagram illustrating another embodiment of an update distribution system including an update server array having an update store and a plurality of update device servers.

FIG. 1D illustrates yet another embodiment of an update distribution system 140. The update distribution system 140 includes the update generator 102, a plurality of client devices 104a, 104b, 104c, 104d, 104e, 104f, 104g, 104h, 104i, and another embodiment of a component version of the update server array 142 that is similar in scope and functionality of the update server array 132 as illustrated in FIG. 1C. The update server array 142 includes the update store 133, comprising the update management component 134, and a plurality of update device servers 136a, 136b, 136c. The plurality of update device servers 136a, 136b, 136c are capable of establishing a communication link with the client devices 104a-104i via communication media 112a-112i, respectively, and may bi-directionally communicate with the client devices 104a-141i to send or receive version or manifest information. As in FIG. 1B and 1C, the communication media 112a-112i may correspond, for example, to communication media 112 of FIG. 1A. This particular embodiment illustrates that the update management component 134 of the update store 133 may communicate and coordinate the activities of a plurality of update device servers 136a, 136b, 136c and direct the transfer of a plurality of archived update packages to the plurality of update device servers 136a, 136b, 136c. Advantageously, this particular embodiment illustrates the flexibility, effectiveness, and efficiency of the update distribution systems 100,120,130,140 to distribute a large quantity of update packages 104 over one or more hardwired or wireless communications mediums, such as the Internet or wireless local area networks (WLAN). This embodiment of the update distribution system 140 can desirably service the update requirements for a plurality of different client services. Furthermore, the update distribution system 140 can utilize a plurality of different communications means to exchange information and update packages with the client devices.

FIG. 2A illustrates an overview of an update query, retrieval and installation process or update installation process 200 that details the communication between the client devices and the update distribution system 140. The update installation process 200 commences in a start state 202 and subsequently proceeds to a state 204, where the client device 104 establishes a communication link with the update device server 136. The update installation process 200 then proceeds to a state 206 where the client device 104 polls the update device server 136 for the server manifest. In one embodiment, the server manifest may be transferred from the update store 133 to the update device server 136, or the update device server 136 may retain the sever manifest in an onboard memory or storage component for ease of reference. In one aspect, the polled server manifest comprises information used to determine the latest available version of the software, file system, or hardware to be updated. Additionally the server manifest may contain information that describes the size of the update package and other variables used to determine whether an available update is different from the existing file, software component, or firmware present in the client device 104. The polled server manifest may further include an update signature which identifies characteristics of the new code version.

Once the server manifest is transferred to and obtained by the client device 104, the update installation process advances to a state 208 where the client device 104 compares the update signature in the server manifest with that of the existing operational software present on the client device 104. A comparison process may be used by the client device 104 to determine, in a state 210, if the update package 104 should be downloaded from the update device server 136 and installed on the client device 104. After the comparison is completed, the update installation process 200 advances to the state 210. If the client device 104 determines that an update version of the operational software is not desired, needed, or required in the state 210, the update installation process 200 terminates in an end state 218 and may remain inactive until the next scheduled or user-prompted activation.

Alternatively, if the client device 104 determines that an update version of the operational software is desired in a state 210, then the client device 104 requests the update package 110 from the update device server 136 in a state 212. In the state 212, the update device server 136 transfers the request for the update package 110 to the update store 133, where the update management component 134 searches the update store 133 for an available version of the desired update package 110. Furthermore, if the archived version of the desired update package 110 is determined to exist and is available, then the desired update package 110 is retrieved from the archival memory or storage area of the update store 133 and transferred to the update device server 136 if necessary. Thereafter, the update device server 136 transfers the desired update package 110 to the client device 104. In a state 214, the client device 104 receives the update package 110, and the update installation process advances to a state 216 where the client device 104 subsequently installs the update package 110. Aspects of the installation operation will be discussed in greater detail herein below.

In another embodiment, when in the state 214, if the update management component 134 determines that the archived version of the desired update package 110 does not exist or is unavailable, then the update management component 134 sends a request for the desired update package 110 to be generated by the update generator 102. At this point in the update installation process 200, the client device may wait for the desired update package 110 to become available. While the client device 104 waits, the update generator 102 produces the desired update package 110 and transfers the update package 110 to the update store 133. When the update package 110 is available, the client device 104 receives the desired update package 110 for the subsequent installation in the state 216. The installation operation 216 will be discussed in greater detail herein below.

In one aspect, after retrieving and installing the desired update package 110 the update installation process 200 terminates in the end state 218. After updating to the desired version of the file or software component and performing other functions according to developer specifications, the client device 104 may proceed to check for additional updates that may be desirably applied to other file or operational software components. Thus, the update installation process 200 may be repeated periodically as needed or desired for additional update queries. In one exemplary update sequence, if the software component has been successfully updated from version 1 to version 2, the update installation process 200 will check for the availability of an additional version (i.e., version 3) from the update store 133 and proceed to retrieve and install these incremental updates until the file of software component has been updated to the most current version available.

Alternatively, in another embodiment, the update installation process 200 may recognize the presence of multiple available updates (versions) and proceed to update the file or component using the most current version available without sequentially applying each possible update package (i.e., version 1 updated directly to version 3). Following completion of the update cycle for a particular file or software component, the update installation process 200 may determine if other files or software components require updating. Further updates may be processed as before, beginning with the comparison of the update signature state 208 until all files have been updated, and wherein the client device 104 may terminate its operation in the end state 216 and remain inactive until the next activation of the update installation process 200. The client device 104 may be configured to query and retrieve updates automatically, or alternatively the update process may be a user initiated function.

It will be appreciated that the above-mentioned update installation process 200 may be simultaneously and/or separately applied to one or more client devices through one or more update device servers without departing from the scope of the present invention. Furthermore, the above-mentioned update installation process 200 may be applied to any of the above-disclosed embodiments of the update distribution systems 100,120,130,140 using a similar sequence of steps as described in connection with FIG. 2A or 2B.

In one aspect, if the update component 102 is scheduled to operate automatically, then the update component 102 may remain active in the background until the next scheduled operation or alternatively be activated at the time that the update installation process 200 is desirably initiated. The activities comprising the update installation process 200 may further be visible or transparent to the user, according to the developer's preference. Additionally, following the process of polling the server manifest in the state 206 and identifying a difference between the existing version of the file and the latest version available on the update device server 132 in the state 208, the client devices 104 may notify the user that an update is available and wait for permission to retrieve the update or alternatively, the client device may be configured to automatically retrieve the desired update package (either with or without notifying the user).

Figure 2B:
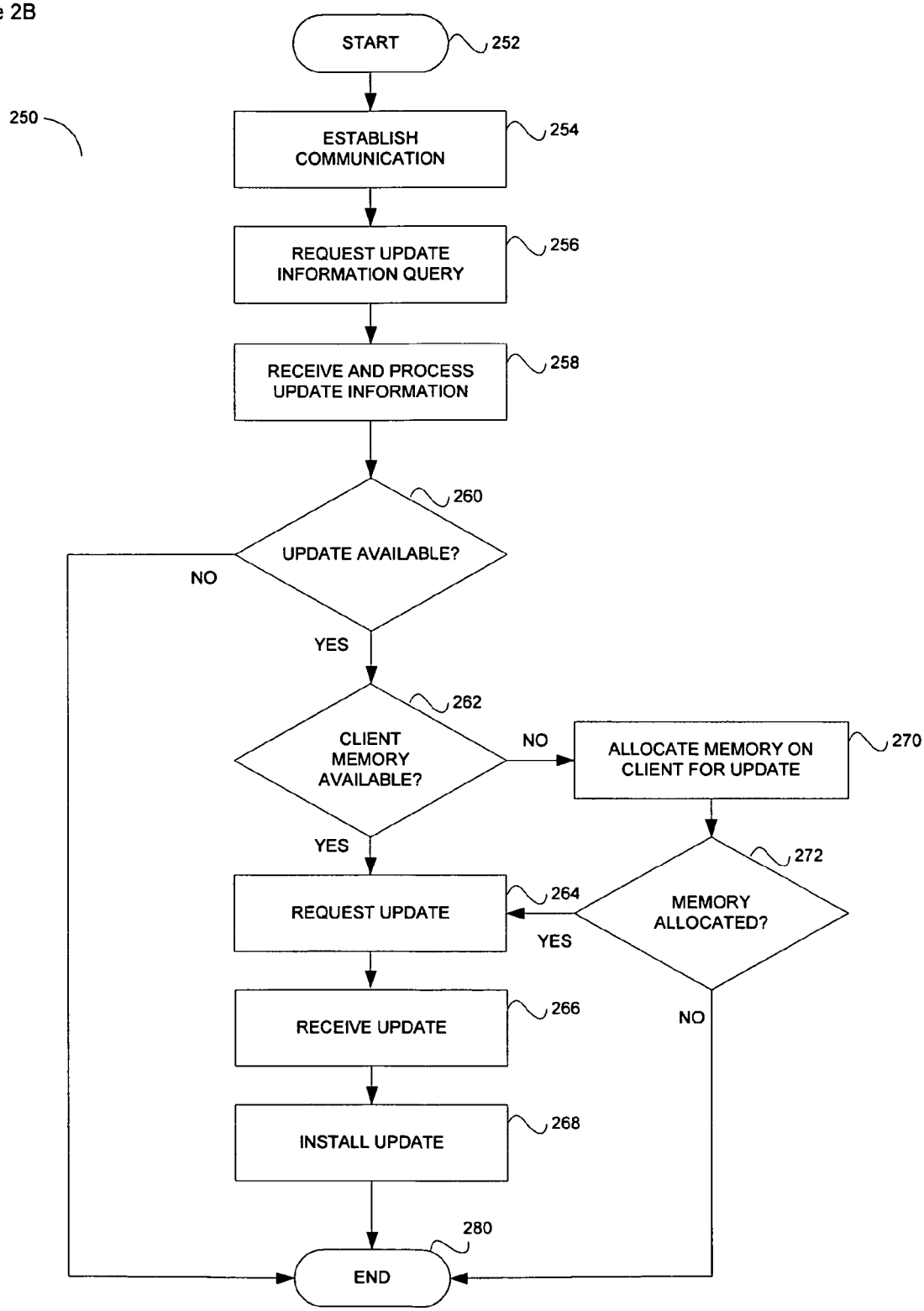
FIG. 2B is a flowchart illustrating another embodiment of an update installation process.

FIG. 2B illustrates another embodiment of an update installation process 250 that may be used in connection with the aforementioned update distribution systems described in FIGS. 1A and 1D. The update installation process 250 commences in a start state 252 and subsequently proceeds to a state 254, where the client device 104 establishes a communication link with the update device server 136. Subsequently, the update installation process 250 proceeds to a state 256 where the update device sever 136 requests an update information query from the client device 104. The update information query includes identity information 113, such as type, model, and make of the device, and version of operational software currently being used by the client device 104. In one embodiment, the identity information 113 may be automatically transferred from the client device 104 to the update device server 136 upon establishing the communication link.

Additionally, the update information query may also include the update signature which identifies the characteristics of a particular file or update component in the new code version.

When the update information query is transferred to and obtained by the client device 104, the client device 104 responds by transferring the requested update information in the query to the client device 104. The update installation process 250 then advances to a state 258 where the client device 104 receives and processes the update information query by comparing the update signature of the new code version of the with that of the existing code version currently in use by the client device 104. A comparison process may be used by the client device 104 to determine, in the state 258, if the update package 104 should be transferred from the update store 133 and installed on the client device 104. After the comparison is completed, the update installation process 250 advances to a state 260 where the update client device 104 determines the availability of the update package 110 from the update information response. If a newer code version is not available in the update store 133, then the update installation process 250 terminates in an end state 280, and the update installation process 250 may remain inactive until the next scheduled or user-prompted activation.

Alternatively, in the state 260, if the client device 104 determines from the update information response that the updated code version is available in the update store 133, then the client device 104 may further determine, in a state 262, from the update information query whether or not the client device 104 has enough memory available to store the update package 110. If the client device 104 determines that enough memory or storage space is available in the client device 104 for the update package 110, then the update device server 136 processes the client update request in a state 264. The update device server 136 then transfers the update package 110 to the client device 104 in a state 266. After receipt of the update package 110, the update installation process advances to a state 268 where the client device 104 installs the update package 110. The update installation process 250 is then terminated in an end state 280 until another update request is made. Additionally, details of the update package installation procedure will discussed in connection with FIG. 10 herein below.

Alternatively, in the state 262, if the client device 104 determines that there is not enough memory or storage space available or allocated in the client device 104 to accommodate the update package 110, then the client device 104 submits a request, in a state 270 to perform an allocation procedure where additional memory or storage space is freed up to accommodate the download transfer of the update package 110. In one embodiment, to allocate space for the download transfer of the update package 104, the client device 104 may write current files stored in a first data area (i.e., RAM) to a second data area (i.e., onboard flash memory). Alternatively, the client device 104 may compress the files stored in the first data area to make more space available for the update package. To further allocate memory, the client device 104 may transfer files to the update device server 136 for temporary storage until the update package 110 is installed. It will be appreciated that a combination of the aforementioned memory allocation schemes may be used to create sufficient room to receive the update package 110. Additionally, other memory allocation schemes may be used without departing from the scope of the present invention.

When the client device 104 completes the space allocation in the state 270, the update installation process 250 advances to a state 272, where, if enough space is made available on the client device 104 for the download transfer, then the update installation process proceeds to the state 264 for the subsequent update request 264, update transfer and reception 266, and update installation 268. Otherwise, the update installation process proceeds to terminate in the end state 280, due to the determination by the update device server 136 that there is not enough space allocated on the client device 104 to accommodate the download transfer of the update package 110. In one embodiment, the update device server 136 may send the update package 110 to the client device 104 in subsections to accommodate the space limitations of the client device 104. The subsections are applied sequentially to complete the update process using a limited amount of available space on the client device 104.

In one embodiment, the installation procedure performs authentication and validation of the integrity of the update package 110 by the client device 104. Thereafter, the update package is saved to non-volatile memory or storage on the client device 104 and the client device 104 is rebooted if necessary. Subsequently, the update package 110 is then decompressed and the instruction set is executed to initiate the installation of the update. It should be appreciated that the above-mentioned installation procedure may be altered or rearranged without departing from the scope of the present invention.

Figure 3:
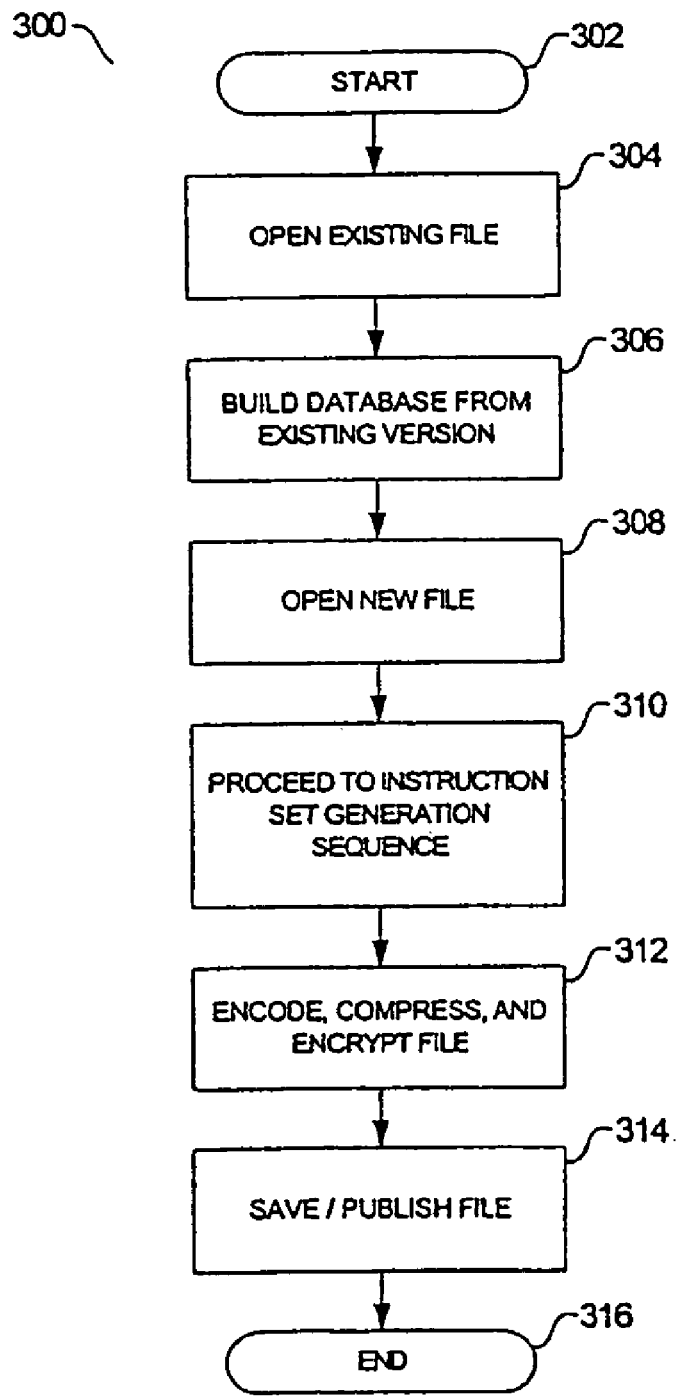
FIG. 3 is a flowchart illustrating one embodiment of an update creation process.

In one embodiment, update packages 110 are made available to the update server array 122, 132, 142 and subsequently to the requesting client devices 104 through the use of an update generator 102 and associated processes. FIG. 3 illustrates an update creation process 300 used to form the update package 110. The update creation process 300 uses configuration parameters associated with the update generator 102 and information present in the existing code version, which is desirably updated to a newer code version. The update creation process 300 commences in a start state 302 and advances to a state 304, wherein an existing file, comprising the current code version is opened. The current code version comprises a file or image that is a representation of the information contained in the electronic device to be updated. In one aspect the current code version reflects the binary code or encoded information stored in the device which is identified and stored in the form of an image file. For example, in the case of a mobile phone, the current code version may reflect the contents of the memory or storage area to be updated. The contents of the memory or storage area may further comprise the operating system code, application code, firmware contents, or other instruction sets used by the electronic device to convey functionality.

One significant feature of the update management system and methods is that the update process operates in a code-independent manner. Updates are generated using images or simulated representations of the memory or storage area to be updated. Update operations need not operate at the instructional level but rather can operate at a high level (i.e., a file level) or at a lower level (where information comprising the instructions is represented in binary, hexadecimal, or other similar forms). The update process therefore recognizes the current code version based on a digital information sequence comprising a designated word sequence or pattern. In one aspect, the size or length of the work may be flexibly defined as a bit, byte, instruction, file, or other informational sequence which is subsequently compared to the desired code version represented by a second word sequence and differences between the two sequences are identified. Thus the update process is not necessarily limited to a particular convention such as determining which instructions need to be replaced to obtain the desired code version, but rather, what word sequences should be changed to transform the existing code version into the desired code version.

Upon opening the image of the current code version the update generator 102 subsequently compiles a collection of digital information sequences from the image for use in a state 306. In generating the update package 110, the collection of digital information sequences may be used to generate an image representing the desired second code version 108. Details of how this collection of digital information sequences is used in instruction set generation and subsequent modification of the existing code version into the new code version will be described in greater detail with reference to FIGS. 5 and 6.

In the state 306, the update generator 102 pre-processes the existing image by searching for digital information sequences that will be used to build a hash table. The hash table includes a plurality of hash values that comprise addresses of particular digital sequences in the first code version that are stored in a data structure for subsequent lookup and retrieval. The hash values correspond to digital information sequences in the existing image, which may be used to build the newer code version. In one aspect, the hash array is formed from the existing code version and identifies strings of digital information sequences in the existing code version. Further details of the hash array will be discussed in connection with FIG. 4 below.

After building the hash array 330 from the existing code version in the state 306, the update creation process 300 proceeds to a state 308 where a new file is opened that will be used to store the instructions used to transform the first code version into the second code version. The new file eventually become the update package 110 which is made available to the servers for transfer to the clients when updating is requested or desired. The update creation process 300 then advances to a state 310 where the update package 110 is generated. As will subsequently be described in greater detail, the instruction set is formed using a plurality of sequence identification and transformation functions that identify operations, instructions, parameters, or digital information sequences which, when executed in an appropriate manner, will transform the existing code version into the updated code version in an efficient manner. During this state 310, the informational composition and sequence of the existing code version is assessed and instructions are identified to transform the existing code version into the new code version.

Following the completion of the code version analysis and instruction set generation in the state 310, the update creation process 300 proceeds to a state 312 where the generated instruction set may be encoded to provide a degree of security that prevents unauthorized access to the contents of the update instruction set. Additionally, the instruction set may be further compressed by utilizing various compression schemes, such as LZW compression, to reduce the overall size of the resulting update package 110. The compressed/encoded instruction set is then stored as the update package 110 in state 314 and may include stored header information, which is used to validate the contents of the update package 110, identify the version of the update, and/or similar functions. The update package 110 may further be transferred to the plurality of update device servers 136a, 136b, 136c in a state 314, where the update package 110 is published and made accessible to the plurality of client devices 104a-104i for downloading. After saving/publishing the update package 110, the update generation process 300 terminates in an end state 316.

Figure 4:
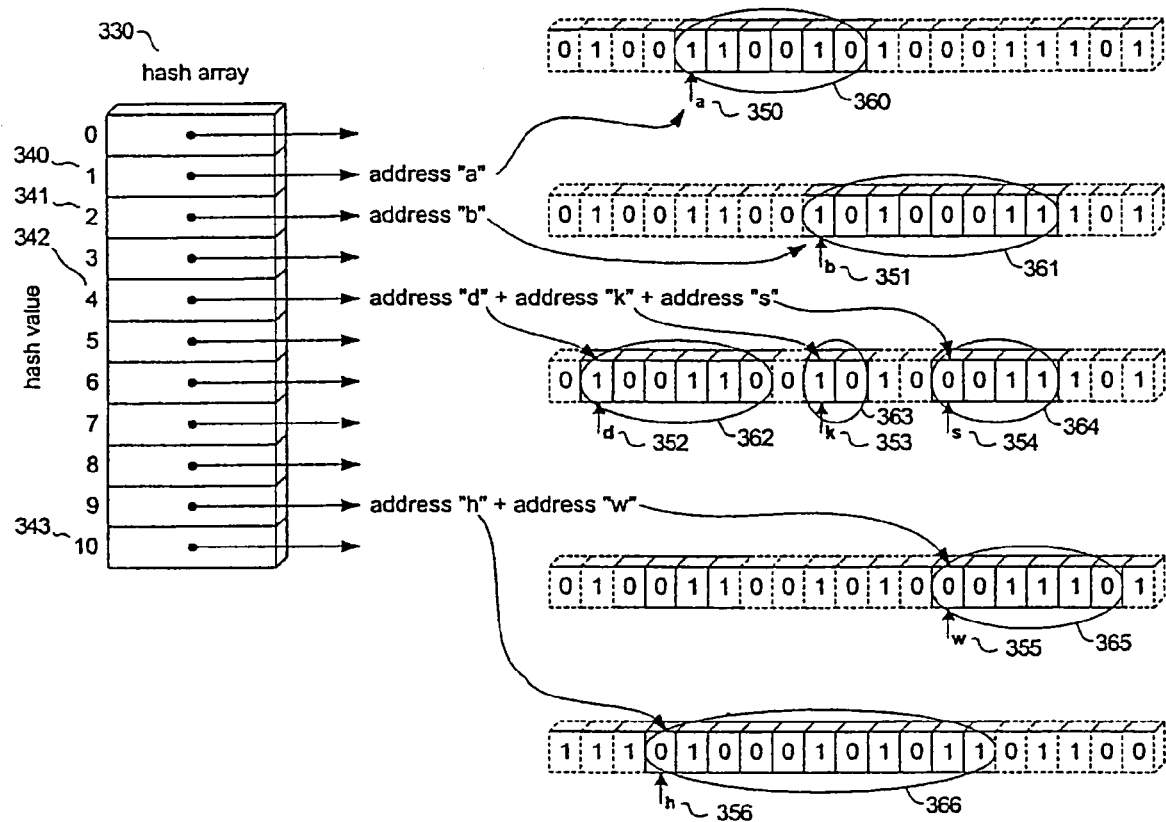
FIG. 4 illustrates one embodiment of a hash array.

FIG. 4 illustrates one embodiment of a hash array 330 discussed in connection with FIG. 3 above. The hash array 330 comprises a plurality of hash values 340-343 that are used to store and reference one or more addresses 350-356, which correspond to the position of a plurality of digital information sequences or words 360-366. In one aspect, the digital information sequences or words comprise words having known lengths or sizes. Each word 360-366 may further comprise one or more bits, bytes, or other recognizable quantum of information. The word length used in the update process need not necessarily be fixed and may instead be flexibly assigned as determined by the update management system or the manner in which information is stored in the electronic device.

In one aspect, the length of the words 360-366 for which hash values 340-343 are calculated is selected to be of a length recognized by the architecture of the electronic device. These hash values 340-343 are stored in the hash array 330 and used by the update generator to determine if a desired word required in the updated code version can be obtained from the current code image. In one aspect, the length of the words 360-366 used in creating the hash value 340-343 is selected to have a discrete word length comprising one or more bits, bytes, or other commonly used quantum of information. It will be appreciated however, that other word lengths can readily be used in generating the hash value 340-343.

By using a known word length for the determination of the hash value 340-343 the update generator can create a summary or database of words that can be found in the existing code version which may be copied and utilized in forming the new code version. Additional details of the implementation of the hash table and its use in generating the update package 110 will be described in greater detail in FIGS. 6A-6H herein below. In one aspect, the hash values of the hash array 330 are used to reference the words comprising the words by referring to the starting address for a particular sequence that is identified as desirably containing a string of information that can be used in construction of the new code version.

The addresses 350-356 are saved into the data structure of the hash array 330 as the calculated hash values 340-343 which are referenced by the update generator 102 to form instructions that reference existing code section used during the update process. In one aspect, when developing the hash array 330, the update generator 102 assigns hash values for particular words that comprise distinct or desirable digital sequence characteristics, such as a unique sequences, frequently encountered sequences, and/or a difficult to reconstruct sequences. In one embodiment, the primary function of the hash array 330 is to efficiently locate 'identical' word between a target sequence (e.g., a sequence required in the updated code version) and a source sequence (e.g., a sequence presently located in the existing code version). The hash array 330 is further used to determine the start address for the 'identical' word in the existing code version so that this word can be 'recycled' or 'reused' in the updated code version. Thus, words that are identified to already exist in the code need not be included in the update package but rather one or more instructions may instead be used to retrieve and/or copy the existing word information into new locations in the updated code. This feature substantially reduces the required size of the update package 110 as the instructions used are typically smaller than the corresponding sequence for which they identify. It will be appreciated that each hash value 240-343 may be accessed numerous times to generate the same word in one or more locations and can be used as needed to efficiently generate required words.

One desirable feature of the hash array 330 is that it serves as a "dictionary" of available digital information sequences or words present in the existing code version. The update generator uses these code sequences or words to produce the new code version by rearranging and copying this information. By "reusing" code in this manner, the update package is desirably reduced in size as instructions for code copying and rearrangement are typically significantly smaller in size compared to the literal code sequence or word. Thus, a single instruction may be able to produce code equivalent to many bits or bytes of information.

In the hash array 330 shown in FIG. 4, the address "a" corresponds to the address where a word 360 corresponding to the bit sequence "1100010" can be found in the previous code version. The code generator may specify an instruction that desirably accesses this index 340 in the hash array 330 and furthermore may specify a length of information that is to be copied from the word at this location. For example, bit sequences which may be obtained from the word at address "a" include "1", "11", "110", "1100", "11001", "110010", and so forth. Similarly, the word at address "b" may be used to generate bit sequences including "1", "10", "101", "1010", "10100", "101000", "1010001", "10100011", and so.

By identifying words or sequences in the existing code version that can be used in the new code version the amount of information which must be contained in the update package 110 is desirably minimized. As previously noted, the sequence corresponding to each word which is addressed by way of example may instead represent other quantum of information including one or more bits, bytes, files or other recognized sizes and lengths of information. It will therefore be appreciated that these other configurations of information can be addressed in a similar manner (i.e., bit-wise addressing, byte-wise addressing, file-wise addressing, etc.)

In another aspect, one or more words, which may comprise bit or byte sequences, can be formed by linking information located at various addresses. For example, the hash value 342 corresponds to the linked address "d", "k", and "s" with each address associated with a particular work 362-364. In a manner similar to that described above, variable portions of each word from each address may be concatenated together to generate still further combinations of word patterns. In one aspect, the addresses for a particular hash value are associated using a linked list data structure. The association of addresses can be used to concatenate information located in close logical proximity as shown for the hash value 342 and may further associate disparately arranged information as shown by the hash value 343. This hash value 343 comprises the addresses "h" and "w" for the words 365, 366 respectively which may be located in different sections of the memory or storage area that are desirably associated to form digital information sequences resulting from the combination of information located at these addresses. The hash value 343 may also be formed in a manner such that sequential row or bank numbers of the memory or storage area are arranged to create the desired sequence of information. For example a first bank number may correspond to a first address in the hash value 343, a second bank number may correspond to a second bank address, and so forth. It will be appreciated that the concatenation of address information may be applied in many different combinations using a plurality of addresses to generate large numbers of possible informational sequences that can be used to form the new code version. Additional details of the memory or storage bank arrangement, the formation and configuration of the instruction set using hash values 340-343, and the resultant generation of desirable digital information sequences using existing code will be described in greater detail herein below.

Figure 5:
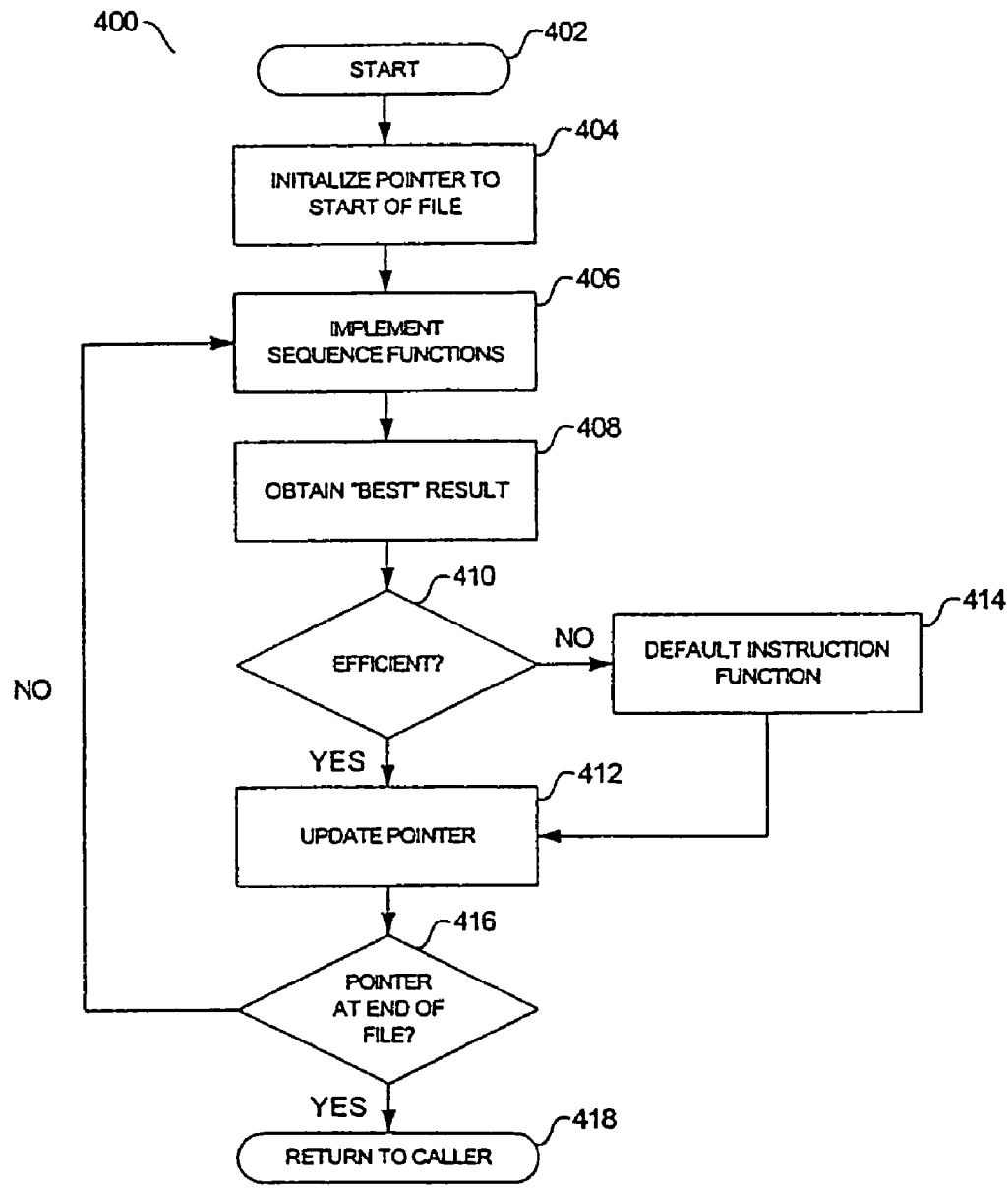
FIG. 5 is a flowchart illustrating one embodiment of an instruction set generation process.

FIG. 5 illustrates one embodiment of an instruction set generation process 400, which is used by the update generator 102 to generate the instruction set used to convert the first code version into the second code version. In one aspect, this process 400 functionally describes the manner in which the instructions are selected for use in the update package 110. This process 400 further identifies a plurality of instructions that perform the code conversion or version update in an efficient manner. In one aspect, the instruction set generation sequence 400 assesses numerous combinations of instructions that may be used to perform the code conversion and desirably identifies instructional combinations that reduce the amount of information that must be included in the update package 110. This in turn reduces the size of the update package 110 and reduces the transmission time needed to send the update package 110. By using existing code sequences when possible, in combination with specialized instructions that may be applied to the code, the previous code version is desirably transformed into the new code version in a manner that further reduces the amount of information that must be included in the update package 110.

The instruction set generation sequence 400 commences in a start state 402 and then advances to a state 404 where the update generator 102 initializes a pointer corresponding to the beginning of the existing file or code version. The pointer maintains a reference position that may used by the sequence analysis functions to determine when the digital information sequence analysis is complete. In one aspect, the digital information sequence analysis comprises a plurality of comparison functions each used to analyze a corresponding instruction type. These instructions may include an existing sequence instruction, a run length instruction, a hash instruction, and a default instruction. It will be appreciated that the aforementioned instructions and corresponding comparison functions are but several of many possible instructions that may be used in the instruction set generation sequence and other instructions may be devised and used in conjunction with the update management system and methods.

At state 406, the comparison functions are applied against the code corresponding to location where the pointer indicates and a determination is made as to how much new code can be generated using each of the instructions related to the comparison functions. In one aspect, the comparison functions use the instructions to provide a separate method for representing particular code fragments. In some instances, one instruction will provide better performance than another instruction depending on the code composition. For example, based on a given code sequence present within the existing code version at the location of the pointer, the existing sequence may be able to translate 3 words of information, the run length function 5 words of information and the hash sequence function 8 words of information. At state 408, the process identifies which of the comparison function exhibits the best characteristics relative to the other comparison functions. Typically, the best result is identified as the comparison function that generates the largest code sequence using a single instruction or group of instructions. In the case of the example above, the hash sequence function exhibits the longest word representation (8 words) and would be preferentially selected over the other comparison functions which translate less code relative to the hash sequence function. Of course, for other code sequences, one of the other comparison functions may be more desirable and have the ability to translate a larger code section relative to the other comparison functions.

Upon selecting the "best result" from the comparison functions at state 408, the process 400 proceeds to a state 410 where a determination is made as to whether or not the identified comparison produces an efficient result. In one aspect, efficiency is measured as a function of the amount of code that can be represented by a single instruction. A threshold of efficiency is used to insure that the identified "best result" is at least as efficient or more efficient than a default instruction function comprising incorporating the literal string directly into the update package 110. If the identified best result function is more efficient than the default instruction then the instruction coding for the information sequence coded by the comparison function is incorporated into the update package 110 and the pointer is updated to the first section of information immediately following the code translated by the comparison function in a state 412. Otherwise, if the default instruction is determined to be more efficient than the "best result" function, then the default instruction is included in the update package 110 in state 414 and the pointer updated in a similar manner in state 412.

After updating the pointer in state 412, the process 400 determines if the pointer has reached the end of the file in state 416. If the pointer has not reached the end of the file, then the process proceeds to state 406 where the sequence analysis commences for the next code section and may be repeated as necessary using the updated pointer position as a reference. In this manner, the entire file is "stepped through" by progressively incrementing the pointer as the comparison functions are successfully implemented and the most efficient instruction selected. When the end of the file is reached, the instruction set generation process 400 advances to a state 408 where the process terminated and the update package 110 comprising the selected instructions determined in the previous steps is packaged and made ready for distribution.

As previously indicated, the digital information sequence functions update or change the pre-existing digital information sequences in an older code version, such as the first version 106 in FIG. 1, to updated digital information sequences in the newer code version, such as the second version 108 in FIG. 1. In one embodiment, the instruction set generation sequence 400 may use additional instructions for an increased conversion efficiency by providing other methods for updating the code version. Details of each of the disclosed comparison functions will be described in greater detail in connection with FIGS. 6A and 6D. In the following description and associated Figures, exemplary bit and byte sequences corresponding to different word lengths are shown. It will be appreciated that these examples represent but a few of the many possible embodiments of word lengths and sizes that may be used in conjunction with the update management system and methods.

Figure 6A:
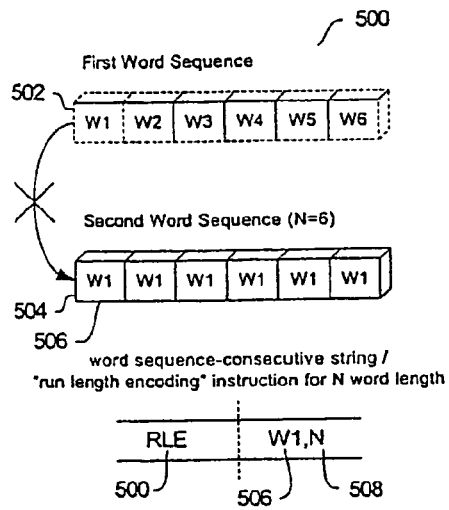
FIG. 6A illustrates one embodiment of a run length encoding instruction.

FIG. 6A illustrates one embodiment of a run length encoding (RLE) instruction 500 that may be used in conjunction with the aforementioned instruction set generation process 400. A first word sequence 502 representative of a digital information sequences from the first code version 106, and a second word sequence 504 representative of a digital information sequence from the second code version 108 as shown. When the second word sequence 504 that starts at a particular position of the second code version 108 is determined by the update generator 102 to comprise consecutive series of a particular word 506, such as a value of "W1", then the RLE instruction 500 may be used for a specified word length (N) 508, such as in this case N=6, to generate the desired digital information sequence. The word length is the quantity of word components that are sequentially repeated without interruption by a different value. Using the RLE instruction, repeated word patterns can be readily reconstructed using a single instruction. This instruction desirably occupies less space in the update package compared to the corresponding number of words to be represented in the second code version.

The RLE instruction 500 can further be used to specify that a particular word sequence in the first code version is overwritten or modified to form the second code version. Thus, as shown in the illustrated embodiment, the word pattern "W1, W2, W3, W4, W5, W6" in the first code version may be overwritten in the second code version to form the word pattern "W1, W1, W1, W1, W1, W1". Alternatively, only a portion of the existing word pattern may be overwritten in the new code version by the consecutive word pattern or the consecutive word pattern may be concatenated on to an existing word pattern. Additionally, one or more word components may be specified by the word length 508a specified in the RLE instruction 500 therefore word patterns including "W1", "W1, W1", "W1, W1, W1", "W1, W1, W1, W1" and so on can be generated using the RLE instruction with a different word length parameter.

In one aspect, the first word sequence 502 that starts at the same particular position of the digital information sequence from the first code version 106 is replaced with a repeating word sequence of an equivalent length in the second code version. Said another way, the RLE instruction 500 identifies word-wise repeating digital information sequences beginning at a particular position in the file code and replaces the pre-existing digital information sequence using a single instruction. Additionally, if the RLE instruction 500 is later determined to yield the "best" result, as described in the state 408 in FIG. 5 then the RLE instruction 500 for the repeating word-wise sequence 504 is stored in an instruction list along with other parameters, such as the desired number of repetitions 508 of the word. The instruction list represents the series of instructions that are identified by the sequence analysis and instruction set generation function 400 that is required to transform the first code version into the second code version using the update package 110.

One advantage to using the RLE instruction 500 is that consecutive strings of word-wise components in the digital information sequence may be easily placed in the newer code version with a single instruction. Another advantage of using the RLE instruction 500 is that this instruction is relatively simple to execute due to the repetitive nature of the consecutive word-wise string of the second word sequence 504, which will be used to generate the desired digital information sequence.

Figure 6B:
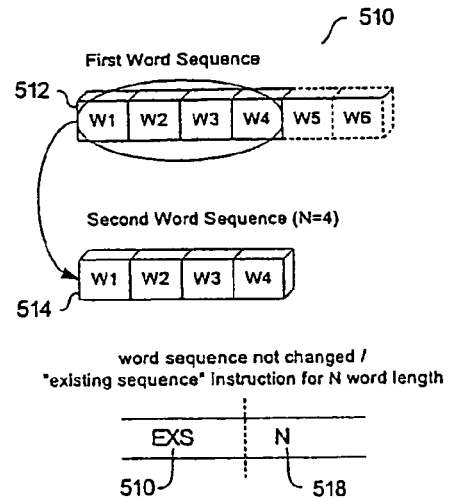
FIG. 6B illustrates one embodiment of an existing sequence instruction.

FIG. 6B illustrates one embodiment of an existing sequence (EXS) or duplicate instruction 510 where a first word sequence 512 representative of a digital information sequence from the first code version 106, and a second word sequence 514 representative of a digital information sequence from the second code version 108 are shown. If the first word sequence 512 that starts at a particular position of the digital information sequence from the first code version 106 is the same or substantially identical to the second word sequence 514 that starts at the same particular position of digital information sequence from the second code version 108, then the EXS instruction 510 may be used for a specified word length (N) 518, such as in this case N=4, to reflect the similarity. As previously shown for the RLE instruction 500, the EXS instruction 510 desirably comprises a word length parameter 518 which is used to determine the extent of the similarity between the first and the second code versions.

In one aspect, the EXS instruction 510 is used by the update generator 102 to identify the existing word sequence which remains unchanged between versions of the code and therefore does not need to be updated or altered during the update process. Furthermore, if the update generator 102 determines that the existing sequence instruction yields the "best" result during the digital information sequence analysis, then the EXS instruction 510 along with the specified word length 518a may be stored in the instruction list along with other parameters, such as the number of repetitions of the digital information sequence. One advantage to using the EXS instruction 510 is that pre-existing word-wise digital information sequences which remain unchanged may be identified and a single small instruction may be incorporated into the update package 110 to reflect the similarity rather than incorporating redundant or unnecessary code.

Figure 6C:
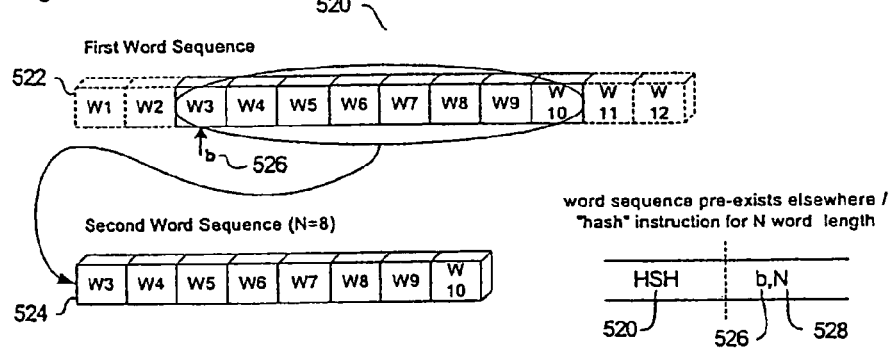
FIG. 6C illustrates one embodiment of a hash instruction.

FIG. 6C illustrates one embodiment of a copy from address or hash (HSH) instruction 520. A first word sequence 522 representative of a digital information sequence from the first code version 106, and a second word sequence 524 representative of a digital information sequence from the second code version 108 is shown by way of example. If the first word sequence 522 that starts at a particular position of the digital information sequence at an address 526, such as in this case address "b", from the first version 106 of operational software code is the same or significantly identical to the second word sequence 524 that starts at a different position of digital information sequence from the second version 108 of operational software code, then the HSH instruction 520 may be used for a specified word length (N) 528, such as in this case N=6, to reflect the update package digital information sequence.

In one aspect, the hash sequence function finds words by calculating hash values for fixed length digital information sequences. The hash values are then compared to the hash table values. If the value of the calculated hash value matches that of a stored hash table value then the start address for the digital information sequence corresponding to the stored hash table value is obtained. When such a match has occurred, a more detailed scanning of the word at the specified address is then performed to determine the maximum length of the word which can be utilized. If the hash table contains more than one stored hash value that matches the calculated hash value, then each possibility may be evaluated and the longest match or most efficient match may be used as the result.

The HSH instruction 520 involves a hash sequence function, wherein the update generator 102 utilizes existing word sequences referenced by addresses stored in the hash table 330 to determine digital sequence matches corresponding to calculated hash values found in the hash table data structure. For example, if the update generator 102 determines that the hash sequence function yields the "best" result of the digital information sequence analysis, then the HSH instruction 520 along with the specified address location 526 and the specified word length 528 may be stored in the instruction list along with other parameters, such as the number of repetitions of the digital information sequence. One advantage to using the HSH instruction 520 is that pre-existing word-wise digital information sequences may be identified in the existing code where the hash table 330 acts as a dictionary of available word. The HSH instruction 520 therefore reflects the ability of the update generation process to recycle code sequences or words in a novel manner rather than including these sequences or words within the update package 110 directly. Another advantage of using the HSH instruction 520 is that this instruction 520 may be used to generate large sections of code by combining various code sections reflected by the addresses referenced in the hash table. For example, as shown in FIG. 6C, the word sequence "W3, W4, W5, W6, W7, W8, W9, W10" in the second code version may be desirably identified in the first code version at the address "b" The HSH instruction 520 uses this address as a reference and copies the code present at this location into the desired location in the second code version. The instruction to perform this operation is desirably smaller in size than incorporating the literal string referenced by the address. Thus, the instruction "HSH b, N" may be used to copy the entire contents of the string located at address "b" and having a length specified by the value of N (N=8 in the example to copy the string "W3, W4, W5, W6, W7, W8, W9, W10".

Figure 6D:
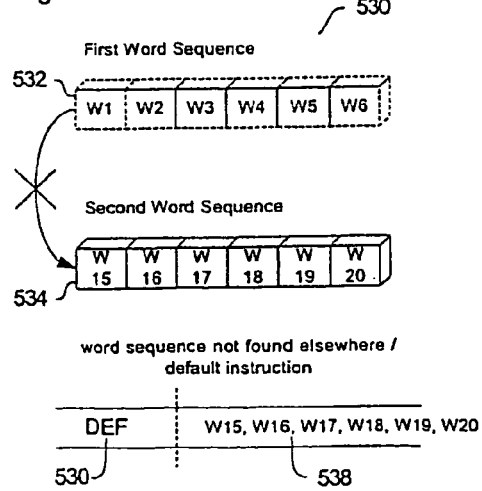
FIG. 6D illustrates one embodiment of a default instruction.

FIG. 6D illustrates one embodiment of a default (DEF) instruction 532. As previously indicated the DEF instruction 532 is applied by the instruction set generation process 400 when no other instruction can be found to efficiently represent the desired digital information sequence. The DEF instruction 532 is used to replace a digital information sequence from the first version 106 of operational software code with the literal contents of a string or other information sequence associated with the DEF instruction. In other words, the DEF instruction 530 identifies word-wise patterns of digital information sequences that do not match pre-existing digital information sequences in the file code of the first code version 106 and cannot be efficiently reconstructed using other instructions. If the DEF function 530 is determined to yield the "best" or most efficient result of the digital information sequence analysis, then the DEF instruction 530 for the patterned word-wise sequence 534 is stored in the instruction list along with the literal contents of the string or information sequence to be inserted. Thus, the instruction "DEF W15, W16, W17, W18, W19, W20" may be used to copy the literal contents of "W15, W16, W17, W18, W19, W20" into the desired location. One advantage to using the DEF instruction 530 is that non-existing strings of word-wise components in the digital information sequence may be readily inserted in the newer code version of with a single instruction that is desirably incorporated into the update package 110.

Figure 7:
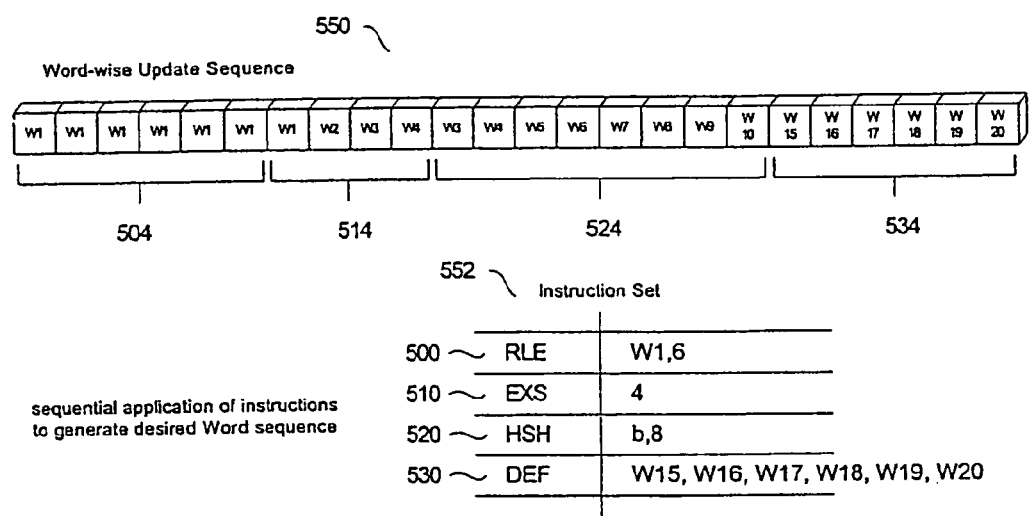
FIG. 7 illustrates one embodiment of a reconstructed digital information sequence.

FIG. 7 illustrates one embodiment of a reconstructed digital information sequence 550, wherein the reconstructed sequence 550 may be obtained using an instruction set 552 comprising a plurality of instructions used to generate portions of the sequence 550. In the illustrated embodiment, the reconstructed sequence 550 is generated using word-wise instructions. The process of implementing the first instruction set 552 comprises sequentially applying the instructions 500, 510, 520, 530 to generate the desired word sequence 550. Following a step-wise execution of the instructions of the instruction set, the RLE instruction 500 generates a first bit sequence in the update file, which corresponds to the run length encoded bit sequence 504. The RLE instruction 500 generates the bit sequence "W1, W1, W1, W1, W1, W1, W1" based on the input parameters. Advancing to the next instruction, the EXS instruction 510 generates a second bit sequence, which corresponds to the duplicated bit sequence 514 "W1, W2, W3, W4". The EXS instruction does not copy or alter any bits in the specified region but rather identifies the pre-existing word pattern and leaves this sequence intact. The subsequent HSH instruction 520 generates a third word sequence, which corresponds to the copied word sequence 524 "W3, W4, W5, W6, W7, W8, W9, W10" from the specified address "b" 526. Finally, the DEF instruction 530 generates a fourth word sequence, which corresponds to the added word sequence 534 "W15, W16, W17, W18, W19, W20." As previously indicated, the DEF instruction may be used to insert one or more word patterns into the word sequence that either are not found in the existing code version or cannot be efficiently constructed using the aforementioned comparison functions. The illustrated reconstructed word-wise sequence 550 is but one example of the implementation of the instruction set 552. It should be appreciated that the instruction set 552 may comprise one or more instructions 500, 510, 520, 530 in various combinations that may be used to transform the existing code version into the desired code version. One advantage to creating the instruction set to represent the desired code version is that the update package 110 is relatively small compared to an update package that is composed exclusively of literal digital information sequences obtained from conventional differencing methodologies. As a result, transferring the relatively small update package image across a communications medium is more efficient than transferring larger literal updates used by conventional methods.

Figure 8A:
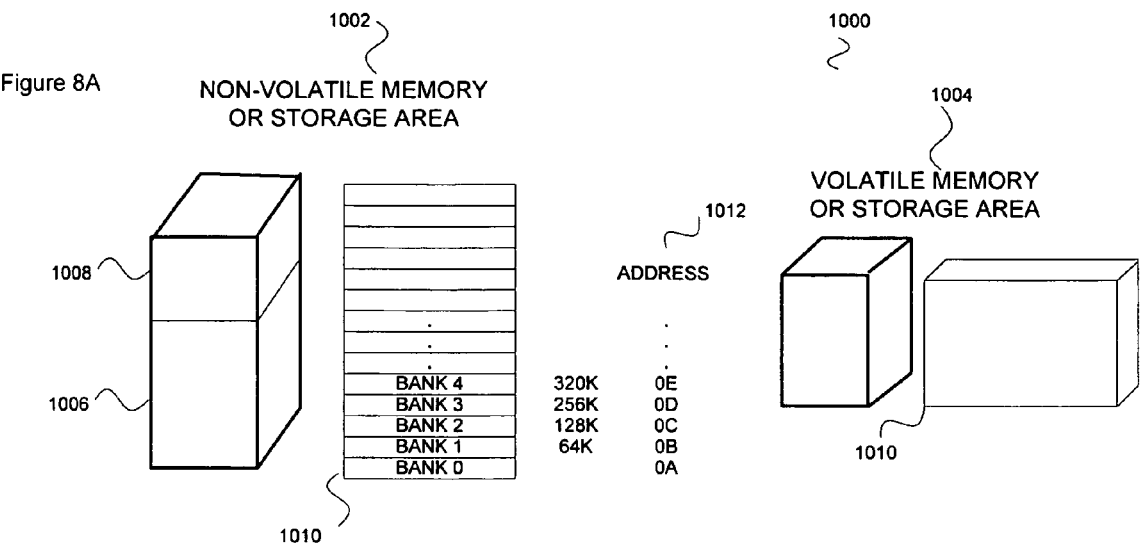
FIG. 8A illustrates one embodiment of an exemplary memory or storage architecture.

FIG. 8A illustrates one embodiment of the memory or storage architecture 1000 for a portable electronic device to be used in conjunction with the update management system. This architecture is representative of many conventional electronic devices including mobile phones, personal digital assistants, pagers, or other devices that are to be desirably updated using the update management system and methods.

In one aspect, the architecture 1000 comprises a non-volatile memory or storage area 1002 and a volatile memory or storage area 1004. The non-volatile area 1002 is used by the electronic device to store information in a semi-permanent state where the device may be powered down or turned off without loss of the information stored in this area 1002. The non-volatile area 1002 may be further logically subdivided to contain a code section 1006 and a data section 1008. The code section 1006 is responsible for storing information such as the system operating software or firmware code that provides the functionality for device operation. The data section 1008 stores non-essential or user-derived information or other information that may be desirably re-written or changed as necessary. In a typical mobile phone, the data section 1008 may contain information including phone numbers, addresses, or personal memos that are saved so that they may be retrieved when needed or desired without loss due to powering down of the electronic device.

Both the code and data sections 1006, 1008 may be accessed and written to throughout the update process to modify existing code stored therein. The data section 1008 also provides an area of memory or storage space that may be used during the update process to store a copy of the update package 110 when it is received by the client. Furthermore, the data section 1008 may store information during the update to provide a degree of fault tolerance should the update operation be interrupted. Details of the fault-tolerant aspects of the update process will be described in greater detail in connection with FIGS. 9 and 10.

While the non-volatile memory or storage area is illustrated as having separate code and data sections, it will be appreciated that the update methods presented herein can readily be adapted to other memory or storage configurations. For example, the non-volatile storage area 1002 may comprise a hardware storage device such as a disk drive, optical drive, or other device implementation which may be used to store information in a non-volatile manner. Additionally, in the case of the non-volatile memory storage area, the memory configuration need not be logically subdivided into separate code and data sections in order to be used with the update management system and methods. It is conceived that the aforementioned memory or storage area configuration represents but one embodiment of an architecture that may be adapted for use with the present invention and other memory or storage areas architectures and configurations can readily be adapted in a similar manner by one of skill in the art.

In one aspect, the architecture of the electronic device specifies that the non-volatile memory or storage area 1002 is partitioned or logically divided into a plurality of storage banks 1010. Each storage bank 1010 is representative of a discrete quantity or size of storage area and may be associated with a unique address 1012. Using the address 1012 as a reference, the storage banks 1010 may be individually referenced and the contents contained therein read from or written to as determined by the operating system or firmware of the electronic device. Alternatively, the contents of the storage banks 1010 may be accessed independently of the address 1012 by referring to the contents themselves wherein the contents of the banks 1010 are used as a reference to determine the present location within the non-volatile memory or storage area 1002. The storage banks 1010 are arranged in a contiguous manner with bank addresses 1012 that sequentially reference the storage banks 1010 in a predefined manner. For example, as shown in FIG. 8A, the storage banks 1010 of the non-volatile memory stores 1002 is allocated with a common size of 64 kilobytes (K). The storage banks 1010 are further arranged in a sequential manner with the first 64 K of the storage section 1002 being stored in BANK 0, the second 64 K of the storage section stored in BANK 1, and so forth. Additionally, a block address 1012 of "0A" is associated with BANK 0 of the nonvolatile memory store 1002, "0B" associated with BANK 1, and so forth.

It will be appreciated by one of skill in the art that the division and arrangement of storage banks 1010 may vary from device to device and that the system and methods for update management described in connection with the non-volatile area 1002 having 64 K banks 1010 may be readily applied to other configurations. For example, the size of the storage banks may differ from one device to the next or more available memory or storage areas may be available. It is conceived that the present system and methods can be readily adapted to the different characteristics and combinations of the storage areas defined by the architecture 1000 of the memory or storage elements for numerous different types of electronic devices.

In another aspect, the volatile memory or storage area 1004 of the electronic device is configured as a single continuous bank or storage section. Areas within the volatile memory or storage area 1004 can be individually accessed and space contained therein can be flexibly allocated as needed or desired. Like the non-volatile memory or storage area 1002, address information may be used to reference particular sections of the memory 1004, however, the somewhat rigid structure of the nonvolatile memory defined by banks need not be adhered to.

It will be appreciated that the aforementioned memory or storage area banks need not be exclusively comprised of identical bank sizes. Instead, each bank may vary in size with respect to other banks within the electronic device. Additionally, the banks need not be physically or logically contiguous with one another and may be addressed using logical rather than physical addressing schemes. In one aspect, with the files or contents of a personal computer or other computing device may be may be addressed in a logical manner such as for example when using a hard drive having a logical addressing scheme with files stored therein.

Although the memory configuration described herein is representative of many conventional mobile or cellular phone storage architectures. It will be appreciated by one of skill in the art that there are numerous variations in the architecture or allocation of memory or storage areas to which the system and methods presented herein may be applied. Other memory configurations may exist for other electronic devices such as personal digital assistants, computers, satellites, and telematic devices which include not only non-volatile and volatile memory but also include other storage devices such as hard drives, optical media, and the like. Additionally, the memory architecture and allocation schema may vary from device to device, however, the system and methods described herein can readily be adapted to operate with these alternative configurations to represent but other embodiments of the present invention.

In one embodiment the non-volatile memory or storage area 1002 may comprise numerous types or configurations of storage space that desirably maintain information through events such as power down, interruption, and device fault. Exemplary components that may be adapted to function as suitable non-volatile memory or storage area may include hard drives, optical drives, CD-writers, DVD-writers, tape drives, flash memory devices and EPROM devices. Likewise the volatile memory or storage area 1004 may comprise random access memory (RAM) or other volatile memory types. Alternatively, a non-volatile memory or storage area may be used instead of the volatile memory or storage area and serve similar functionality. Therefore, the aforementioned non-volatile memory or storage devices can be adapted to operate in the same manner as the volatile memory or storage area 1004 without departing from the scope of the invention.

Figure 8B:
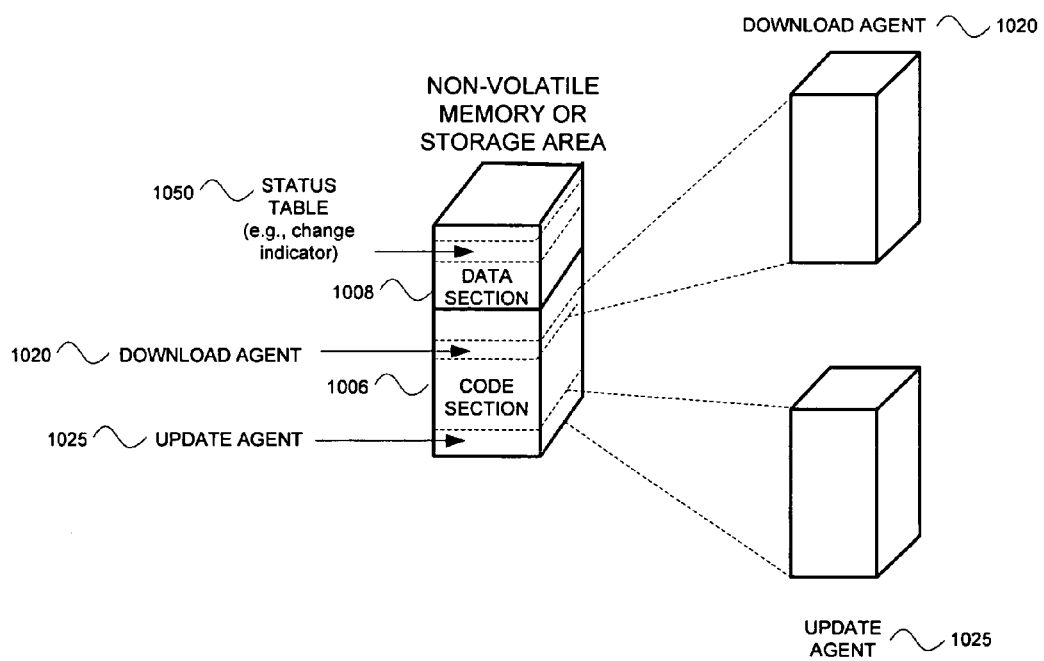
FIG. 8B illustrates one embodiment of a non-volatile memory or storage area.

FIG. 8B illustrates one embodiment of the non-volatile area 1002 which includes a download agent 1020 and an update agent 1025 used to process the update package 110 and perform the update functions. In general, the download agent 1020 carries out functions related to acquiring the update package 110 while the update agent 1025 is responsible for applying the instructions contained in the update package 110 to desirably modify the contents of both the code section 1006 and the data section 1008 of the nonvolatile memory or storage area 1002 such that upon completion of the update process the first original code version is transformed into the second updated code version.

The update agent 1025 comprises an embedded functional component that is desirably stored in the boot sector or section of the code section 1006 of the non-volatile area 1002. During routine operation of the electronic device the update agent 1025 may remain inactive, allowing the device's operating system to perform function calls and command operations that control the device. However, when the update process is initiated the update agent 1025 may take control of the electronic device and perform specific operations related to installing the update package 110. In one aspect, the update agent 1025 is desirably maintained as a specialized application with a service set that is optimized and dedicated to performing functions necessary to install the update. In designing the update agent 1025 in this manner, the size of the update agent 1025 is desirably reduced so as to minimize the amount of space that it occupies in the nonvolatile area 1002.

The update agent 1025 is responsible for processing or executing the instructions contained in the update package 110 which in turn performs the operations necessary to transform the first original code version into the second updated code version. The update agent 1025 may further possess one or more functionalities which are used to perform specific operations related to the update process. For example, the update agent 1025 may include a main functionality for applying the instructions of the update package 110 to the existing code version. Additionally, the update agent 1025 may include functionality for performing client operations associated with update package management. In one aspect, the update agent 1025 may perform operations including string or data processing, memory management, and other operations used to coordinate the activities of the update process. In another aspect, the update agent 1025 includes one of more device drivers used during the updating processes. The update agent 1025 may also contain the functional logic required to manage the update process and may include functions not provided by the embedded operating system needed to carry out the instructions of the update package 110. The update agent 1025 may also include functionality for performing various operations used to compress data in the data section to create sufficient storage space in the data section to receive the update package 110. Finally, the update agent 1025 may include functionality used to prepare the update package 110 such as compression/decompression, encryption/un-encryption, and/or validation of the contents of the update package 110.

The download agent 1020 is responsible for performing operations related to communicating with the update servers and retrieving available update packages 110. Like the update agent 1025, the download agent 1025 may comprise one or more functionalities which are used to perform specific operations related to the update package retrieval process. For example, the download agent 1020 may include functionality for communicating with the server that contains the available update package 110 and also provides necessary handshaking and error correction routines used during the download process. Furthermore, the download agent 1020 may include functionality for performing client operations associated with update package management during the download process. In one aspect, the download agent 1020 may perform operations including string or data processing, memory management, and other operations used to coordinate the activities of the update process. In another aspect, the download agent 1020 comprises one of more device drivers used during the update package download process. The download agent 1020 may also include the primary functional logic required to manage the download process and may include functions not provided by the embedded operating system needed to establish communication with the server and retrieve the desired update package 110. Additionally, the download agent 1020 may include functionality for performing various operations used to compress or reorganize data in the non-volatile and volatile memory or storage areas 1002, 1004 to create sufficient storage space to receive the update package 110. Finally, the download agent 1020 may provide functionality for enabling the use of secure communications between the server and the client device to prevent unauthorized access to the information contained in the update package 110. In still another aspect, the download agent 1020 may contain a dedicated security library that defines one or more encryption schemes used during the transfer of information between the server and the client device.

The download agent 1020 or update agent 1025 may further be used to determine if there is enough available space in the electronic device to decompress and/or prepare the update package 110. If additional space is required, the download agent 1020 or the update agent 1025 may compress or rearrange the contents of either the non-volatile or volatile memory or storage areas 1002, 1004 in order to create sufficient storage space to receive and process the update package 110. After the update process is completed the compressed or rearranged contents of the non-volatile and volatile memory or storage areas 1002,1004 may be returned to their original state allowing the device to resume normal operation and access the contents of these areas 1002, 1002.

One desirable feature of the update agent 1025 and download agent 1020 is that they are designed to occupy a relatively small amount of space within the memory or storage area on the electronic device. This feature is particularly useful in devices where the memory or storage space is limited due to the device constraints such as design, size, and/or power consumption considerations. For example, a typical mobile phone may contain a physical memory store that has an approximate size of 500 K-1500 K. The embedded operating system of the mobile phone occupies a large percentage of this space and additional space must be allocated for user-definable data such as phone numbers, addresses, and the like. The update agent 1025 and download agent 1029 are implemented in such a manner so as to maintain a total size of approximately 20 K-50 K. This relatively small size can be readily accommodated by most electronic devices including those with significant memory or storage area constraints. In instances where memory or storage constraints do not pose as great a problem, the update agent 1025 and/or download agent 1020 can be designed to include additional functionality and features. The overall size of the update agent 1025 and download agent 1020, however, is typically significantly smaller that many conventional update applications or modules.

In addition to the download agent 1020 and the update agent 1025, a status table 1050 may further reside in the non-volatile memory or storage area 1008. The status table 1050 is a data structure whose contents are desirably preserved in non-volatile memory or storage space and which is used during update package retrieval and processing operations to determine the state of operation of the devices. Although, the status table 1050 is shown to be positioned in the data section 1008 of the non-volatile memory or storage area 1008 other configurations exist where the status table 1050 may be positioned in any portion of the non-volatile memory of storage area 1002.

In one aspect, the status table 1050 comprises one or more flags or identifiers that are used by the download agent 1020 and the update agent 1025 to coordinate the activities of the update process. Additionally the status table 1050 may store information that is used in fault tolerant processes to identify the current and completed states of the update process. Furthermore, information contained in the status table 1050 may be used during the device boot process to determine if the device is in a normal operational mode (update process is in an idle state) or in an update processing mode (update process is in a non-idle state). The mode of the device is determined by an update state variable or flag which may be either idle or active. In an idle state, no update operations are determined to be pending and normal device operation should proceed. In an active state, one or more update operations are currently pending and normal device operations should be suspended to permit the update operations to be executed.

During device startup, code execution typically begins at a specific startup address, for example "0x0000". This address refers to a section of the boot block or sector where the update agent 1025 resides. The update agent 1025 checks the status table module 1050 to determine the value of the update state variable to identify updating operations that should be performed or alternatively if no operations are pending then the update agent 1025 transfers program execution to the regular firmware or operating system of the electronic device.

In one aspect, if the update process is interrupted, the current position or state of completion of the update can be resolved using various portions of the update package information. As will be described in greater detail hereinbelow with reference to a fault tolerant update process, the update package may include information such as error correction codes, digital signatures, file or bank sizes, and other information that are interpreted by the update agent 1025 to determine which portions of the code have been successfully updated. If the update process is unexpectedly interrupted, the update agent 1025 uses this information to determine at what position the last successful update had been applied and continues from that point to complete the update process.

In one embodiment the update management system utilizes a bank-by-bank updating process for performing updates to the existing code version of an electronic device. This process is particularly well suited to manage updating tasks of portable electronic devices which typically have only limited update capabilities. Using this method, the update management system overcomes the limitations of many conventional systems which prohibit devices such as mobile phones from being conveniently updated due to memory or storage space constraints imposed by the architecture of the electronic device. For example, in a mobile phone the operating system typically resides in the nonvolatile memory or storage area and may be too large to be held in the volatile memory or storage area which generally has a smaller size due to cost and manufacturing considerations. This limitation prevents a complete image of the operating system from being copied to a suitable "working" area where the update may be applied without possible corruption of the original code version. As a result, electronic devices including mobile phones are limited in the manner in which the update can be performed and typically do not provide a highly fault tolerant update capability rendering them susceptible to update errors which may render the device inoperable.

The present invention overcomes this limitation by providing a mechanism for performing updates in a sectional or bank-by-bank manner. The bank-by-bank updating method does not require an entire image of a file or code version to be stored a "working" area, rather the update operations are performed using a reduced amount of memory or storage space by subdividing the update operations and applying them sequentially to designated code sections. Sectional updating in this manner may be advantageously used in conjunction with relatively small areas of available memory or storage space such as that present in the volatile memory section of a mobile phone. Additionally, the bank-by-bank update method improves fault tolerance and allows the update process to be resumed when an error in updating occurs.

The term "bank" used in describing the invention refers to a portion of memory or storage area that may be flexibly defined. While a bank may have a static size in a particular electronic device, this size may vary from one device to next. Furthermore, banks within a particular electronic device may be variably sized and may refer to the contents of one or more logical or physical blocks as defined by a particular architecture for an electronic device. Although the update process is described with reference to statically defined bank sizes it will be appreciated that the system and methods of the update management system can be readily adapted to accommodate different bank configurations to address the update needs or preferences for many different electronic device configurations.

Figure 9:
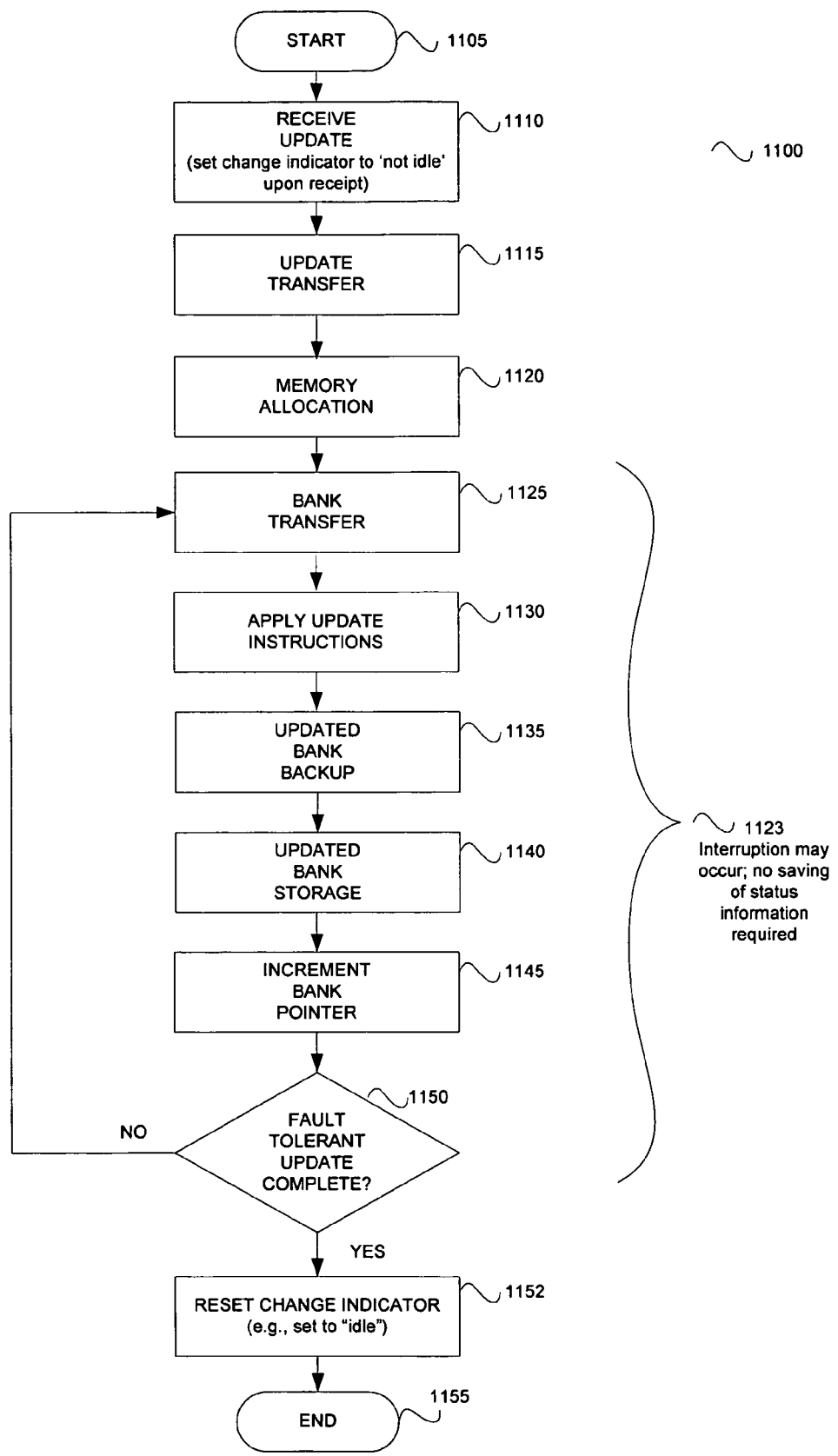
FIG. 9 is a flowchart illustrating one embodiment of a bank-by-bank update method.
Figure 10:
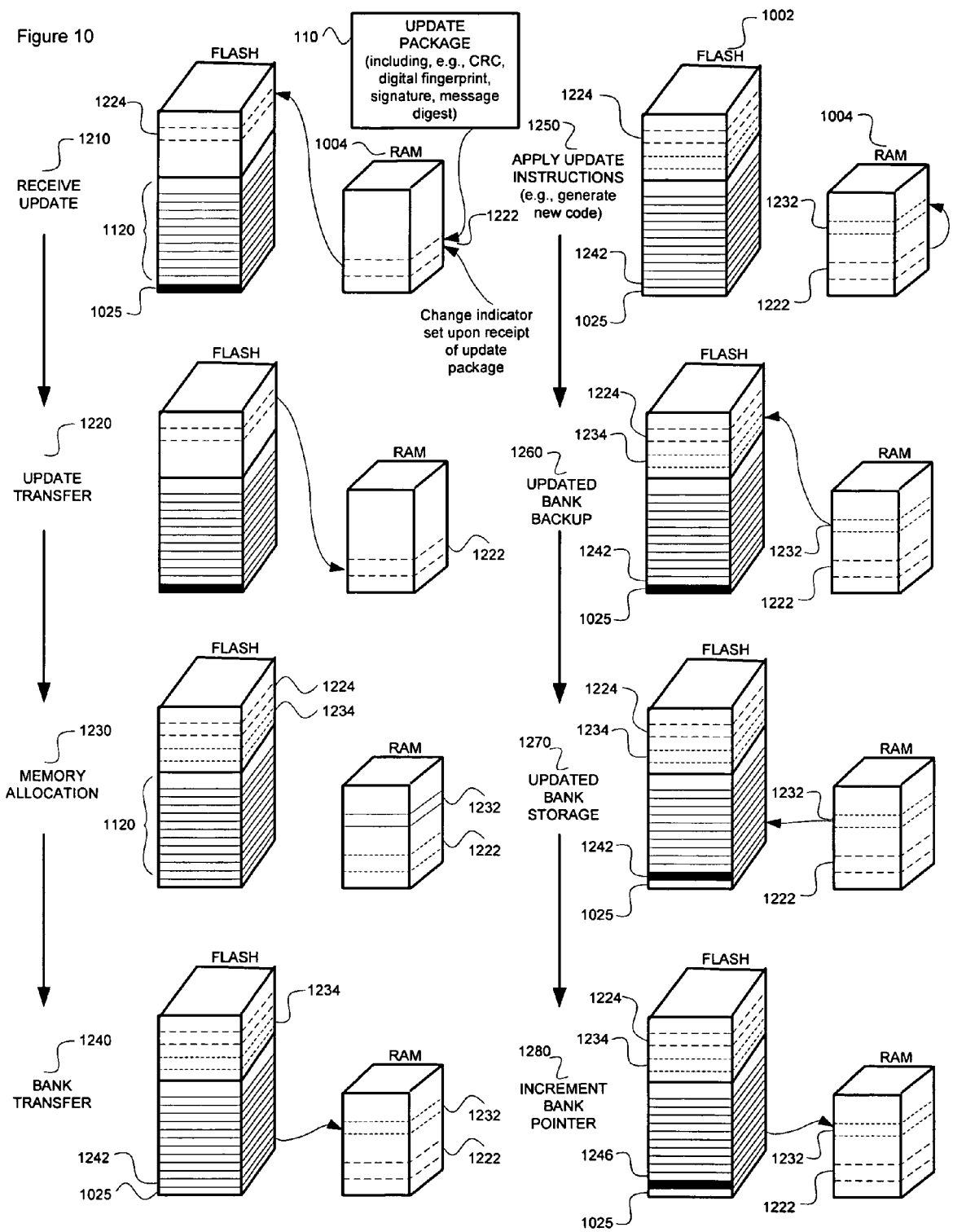
FIG. 10 illustrates one embodiment of the application of an update package using the bank-by-bank update process.

FIGS. 9 and 10 illustrate a bank-by-bank update method that is desirably used by the update management system to transform an existing code version present in the device into a new or updated code version. The code transformation is managed by the update agent 1025 which processes the instructions of the instruction set or update package 110. Throughout the update process, a high degree of fault tolerance is maintained by using numerous checkpointing operations to validate the data contents of each bank. As will be described in greater detail hereinbelow these operations are useful in recovering from errors which might otherwise corrupt the code version and render the device non-operational.

FIG. 9 illustrates an overview of the bank-by-bank update method 1100 that may be used with electronic devices such as mobile phones, pagers, personal digital assistants, or other electronic devices. As previously described with reference to the description of FIG. 8A, the architecture for many portable electronic devices comprises non-volatile and volatile memory or storage areas 1002, 1004. The non-volatile storage area may be further subdivided into a plurality of blocks or banks 1010 which represent discretely addressable locations used to store information or data. The operating system, firmware code, or other information 1120 to be desirably updated is further stored in the non-volatile memory or storage area 1002 and is distributed across at least some of the plurality of banks 1010.

Referring again to FIG. 9, the bank-by-bank update process 1100 commences in a start state 1105 when the electronic device detects a signal to begin updating. In one aspect, the update signal comprises recognizing a change from a normal operating mode to an update processing mode. As previously described, this mode change may be identified using an idle state variable which is set in the status table. The bank-by-bank update process 1100 then proceeds to a state 1110 where the update package is received following a request for transmission from the update server. In this state 1110 the update package 110 is desirably received and temporarily stored in the volatile memory or storage area. When receipt of the update package 110 is complete, the process 1100 proceeds to an update transfer state 1115 where the complete update package 110 is copied into the non-volatile memory or storage area 1002. By copying the update package 110 to the non-volatile area 1002, a level of fault tolerance is achieved and the electronic device may perform subsequent update operations without further communication with the server computer. In one aspect, the status table is updated after the update package 110 has been saved into non-volatile memory to reflect the complete receipt and secure storage of the update package 110.

The update process 1100 continues in a memory allocation state 1120 where space for a "working" bank and a "backup" bank are allocated in the volatile and nonvolatile memory areas 1002, 1004 respectively. The working bank and the backup bank are used by the update process 1100 to perform operations to sectional components of the existing code version in such a manner so that the original code is not altered until the update for the code section has been completed and verified thus insuring that the original code is not corrupted by unexpected processing errors or power interruptions.

During the state 1120 a plurality of pointers are initialized which point to addresses required for the update agent 1025 to process the instructions of the update package 110. A first pointer comprises an instruction pointer that is initialized to point to the address of the first instruction in the update package 110. This instruction is subsequently retrieved by referencing the address pointed to by the instruction pointer and the instruction is applied to the bank information to be updated.

Additionally a working bank pointer is initialized to point to the location in the volatile memory where the bank update will take place. The working bank pointer is used as a reference by the update agent 1025 which performs update operations in the location specified by the working bank pointer. Furthermore, a backup bank pointer is initialized which points to a location in the non-volatile memory where copies of the working bank are maintained to insure fault tolerance in case of power interruptions and reboot or reset operations.

Following completion of the pointer initialization in state 1120 the process 1100 continues with a series of bank update operations 1123 commencing in a bank transfer state 1125 where a section of the original code version that resides in the non-volatile memory or storage area 1002 is transferred to the working bank in the volatile memory area 1004. The code section copied from the original code version corresponds to a bank of information specified by the instruction set which will be desirably operated upon to generate the new code version for that particular bank of information. The process 1100 then proceeds to an apply update instruction state 1130 where the appropriate instruction from the instruction set is executed to modify the working bank of information in such a manner that the old code version contained in the bank is transformed into the new code version.

Once the appropriate instructions have been executed and the corresponding code updated in the volatile working bank, the process proceeds to a bank backup state 1135 where the contents of the working bank are copied into the backup bank located in the non-volatile memory or storage area 1002. Subsequently, the code in the volatile working bank is copied to the appropriate location corresponding to the bank where the original code was obtained from in an update bank state 1140. Upon completion of bank copy in state 1140, the process 1100 proceeds to an new state 1145 where the bank pointer is incremented to the next consecutive bank that is to be updated.

If the instruction pointer indicates that the process 1100 has been completed (i.e. all banks have been updated) then the process 1100 is terminated. At this point, the status table may also be updated at state 1152 to reflect that the update operation is complete wherein the update process resumes an idle state. Thereafter, the electronic device is rebooted and the newly updated code version is used by the electronic device. Otherwise, if the pointer indicates that the process 1100 is not complete (i.e., one or more banks remain to be updated) the process 1100 proceeds to the bank transfer state 1125 where the next bank is copied into the working bank in the volatile memory or storage space 1004 and the process 1100 continues to complete updating of the newly selected bank. In one aspect, the status table is checked during reboot, if an idle status is detected, then normal (non-update) operations resume. If a non-idle status is detected, then the update agent 1025 is directed to control the electronic device.

FIG. 10 further illustrates the bank-by-bank update process 1100 in greater detail and demonstrates the operations in the context of the aforementioned non-volatile and volatile memory or storage areas 1002, 1004 typically present in a portable electronic device such as a mobile phone or personal digital assistant. As previously show in FIG. 8A, the non-volatile memory area is divided into a plurality of banks that are separately addressable and accessible by the update agent 1025. At least some of the non-volatile banks 1120 comprise sections of the memory area that are to be updated by the update agent 1025 using the update package 110. In one aspect, these banks may contain information which comprises the operating system, firmware code, or application that conveys functionality to the electronic device and which is desirably updated from the first code version to the second code version.

As shown in state 1210, the bank-by-bank update process 1100 typically begins after the appropriate available update package 110 is identified and transferred to the electronic device using the functionality of the aforementioned download agent 1020. The update package 110 is received and temporarily stored in a section 1222 of the volatile memory or storage area 1004 and a series of validation checks are implemented to insure that the package 110 is complete and free of errors. These validation checks may include determining a cyclic redundancy check code (CRC) for the received update package 110 and comparing this code against an expected CRC value stored in the update package 110. Furthermore, a validation check may be performed by identifying the size of the update package 110 and comparing this value against the expected size determined by the download agent 1020.

Additionally, the update package 110 may include a digital signature that is evaluated by the download agent 1020 to determine if the received update package 110 is appropriate for application to the existing code version. In one aspect, the digital signature is an identity string that may contain information such as; the name or identification of the device, the device manufacturer, the model or serial number, and other characteristics that may be used to validate the source and content of the transferred data package 110.

Thereafter, the update package 110 is transferred from its temporary location 1222 to a section 1224 of the nonvolatile or flash memory component 1002 for more secure storage. Storage of the update package 110 in the non-volatile memory provides a means for recovering from a power failure, device interruption, or reset operation without requiring retransmission of the update package 110 from the server. As before, one or more validation checks are used to insure that the image contained in the flash memory 1002 is a complete and error free copy of the desired update package 110.

After storing the update package 110 in the flash memory 1002, the idle status flag stored in the status table (not shown) is updated to indicate that the electronic device is ready to proceed into an update mode. Thereafter, the electronic device is rebooted and the status flag is interpreted by the update agent 1025 to suspend normal operation of the device and proceed into an update mode where the update agent 1025 provides primary device functionality to install the update package 110.

Upon rebooting of the electronic device, the contents of the volatile memory component or RAM memory 1004 are typically lost and, as a result, a copy of the update package 110 is copied back into the section 1222 of RAM memory 1004 for use by the update agent 1025 in state 1220. During this state 1220, the update package 110 may be preprocessed to present the update information or instructions in an executable form. For example, if the update package 110 is compressed or encrypted, the update agent 1025 performs one or more operations to render the code of the update package 110 ready for execution. In one aspect, the aforementioned instruction pointer may be initialized to the address of the first instruction to be executed by the update agent 1025. Taken together, these operations prepare update agent 1025 and instruction set for subsequent sequential updating of the existing code version to generate the new code version.

Proceeding to state 1230, a plurality of memory allocation operations are performed which create a working environment for the update agent 1025. In one aspect, a working bank 1232 is allocated in the RAM memory 1002. The working bank 1232 is desirably configured to be the same size as the banks 1120 to be updated in the flash memory area 1004 and acts as an operational buffer or working memory area where operations determined by the instruction set are performed. Additionally, a backup bank 1234 may be allocated or a pointer added in the flash memory 1004 to provide a non-volatile buffer or backup store which is used throughout the update process to provide fault tolerance to power interruptions as well as serve as a backup copy of the data in instances where the data in the working bank 1232 may become corrupted or fail validation checks.

Proceeding to state 1240, the update process commences with the update agent 1025 reading and executing instructions contained in the update package stored in RAM memory section 1222. In one aspect, the instructions of the update package initialize a pointer which points to the address of the first bank 1242 of the flash memory 1002 to be updated. The update agent 1025 accesses the information contained in this bank 1242 and copies the information contained therein to the working bank 1232 of the RAM memory 1002. As before, various validation measures may be taken to insure that the contents of the working bank 1232 accurately reflect the flash memory bank from which it was copied. Should the bank copy procedure fail, the process may be repeated and the contents verified before proceeding to the next update state. It will be appreciated that the use of the working bank 1232 desirably imparts an improved degree of fault tolerance to the update system compared to many conventional methods. In one aspect, a copy of the original (unmodified) code is maintained in the flash memory bank 1002 until the newly updated bank information can be verified and stored in a non-volatile manner. This method of updating desirably reduces the likelihood of data corruption that might otherwise lead to device malfunction. Furthermore, should a bank update operation fail, preservation of the existing code allows the update process to resume from the failed point rather than requiring that the entire update process be restarted from the beginning state. Additional details of the fault tolerant characteristics of the update process will be subsequently described in greater detail.

Proceeding to state 1250, the update agent 1025 applies the appropriate instructions to update the information contained in the copy of the first bank stored in the working bank 1232. As previously described, the instructions may address and copy information from other banks 1120 contained in the flash memory 1002 to obtain information sequences that are desirably used in generating the updated bank information for the working bank 1232. Additionally, other operations may be used to modify the code contained in the working bank to reflect the desired contents as determined by the update generator 102. In one aspect, banks that are determined not be have been changed between the first code version and the second code version do not require further processing and the update process may loop back to state 1240 where a new bank is copied and the process resumed using the corresponding instructions from the update package. Alternatively, those banks which do not require updating are skipped in the previous step 1240 for the purpose of improving update efficiency. Again, numerous error detection measures may take place after the update instruction has been executed to verify that the update bank information is correct.

Proceeding to state 1260, the newly updated information contained in the working bank 1232 is copied to the backup bank 1234 located in the flash memory 1002. A copy of the working bank 1232 is made at this point to provide yet another degree of fault tolerance where if a power interruption occurs subsequent to the copying of the working bank 1232 into the original first bank 1242, the process may identify the point where the fault occurred and proceed from there if a copy of the updated information is maintained in the non-volatile flash memory 1002. If a fault occurs prior to the completion of the copying of the working bank 1232 into the backup bank 1234 the process may attempt to perform the copy operation again from the updated bank 1232 into the backup bank 1234. Alternatively, if a power interruption or other serious fault occurs which results in loss of the volatile memory due to rebooting or restarting operations prior the to completion of the copying of the working bank 1232 into the backup bank 1234, the process may "step back" to the previous steps where the information from the first bank 1242 is copied to the working bank 1232.

From the foregoing it will be appreciated that the update process provides a number of mechanisms to insure that if data corruption or update fault does occur, the process can find a point from which to resume without the potential permanent loss or corruption of data during the update process.

Proceeding to state 1270, once a copy of the newly updated bank information has been safely stored in the backup bank 1234, the update process proceeds to copy the information contained in the working bank 1232 back into the original first bank 1242 located in the flash memory 1002. Like other steps in the update process, the bank information is validated to insure the contents reflect the desired code.

Proceeding to state 1280, the update process is repeated in a similar manner for the next bank 1246 where the bank pointer is updated to the address of the next bank 1246 to be updated. Subsequently, the steps 1240-1270 are repeated using the information from the next bank 1246. In this manner, all of the banks 1120 of the flash memory 1002 may be desirably updated in a fault tolerant manner while accommodating architectural limitations imposed by a RAM memory size less than that of the flash memory size.

When the update agent 1025 determines the update process to be complete, the space allocations (if any) in the flash memory 1002, including the backup update package storage area 1224 and the backup bank 1234, are released so that they may be used for other purposes subsequent to updating. Furthermore, the status flag contained in the status table (not shown) is updated to reflect an idle state where no update operations are pending. Subsequently, the device is reset or rebooted and upon checking the status flag in the status table, the device will return to a normal operational mode until the next update procedure is initiated. In one aspect, the backup storage area 1224 does not require de-allocation or release (as is the case when pointers are used to designate the backup storage area 1224). In this instance, upon completion of the update process other applications or operations can simply overwrite the contents of the backup storage area 1224. Furthermore no special operations necessarily need to be performed on the volatile memory or storage area 1004 as the data contained therein will typically be lost during rebooting operations.

Figure 11:
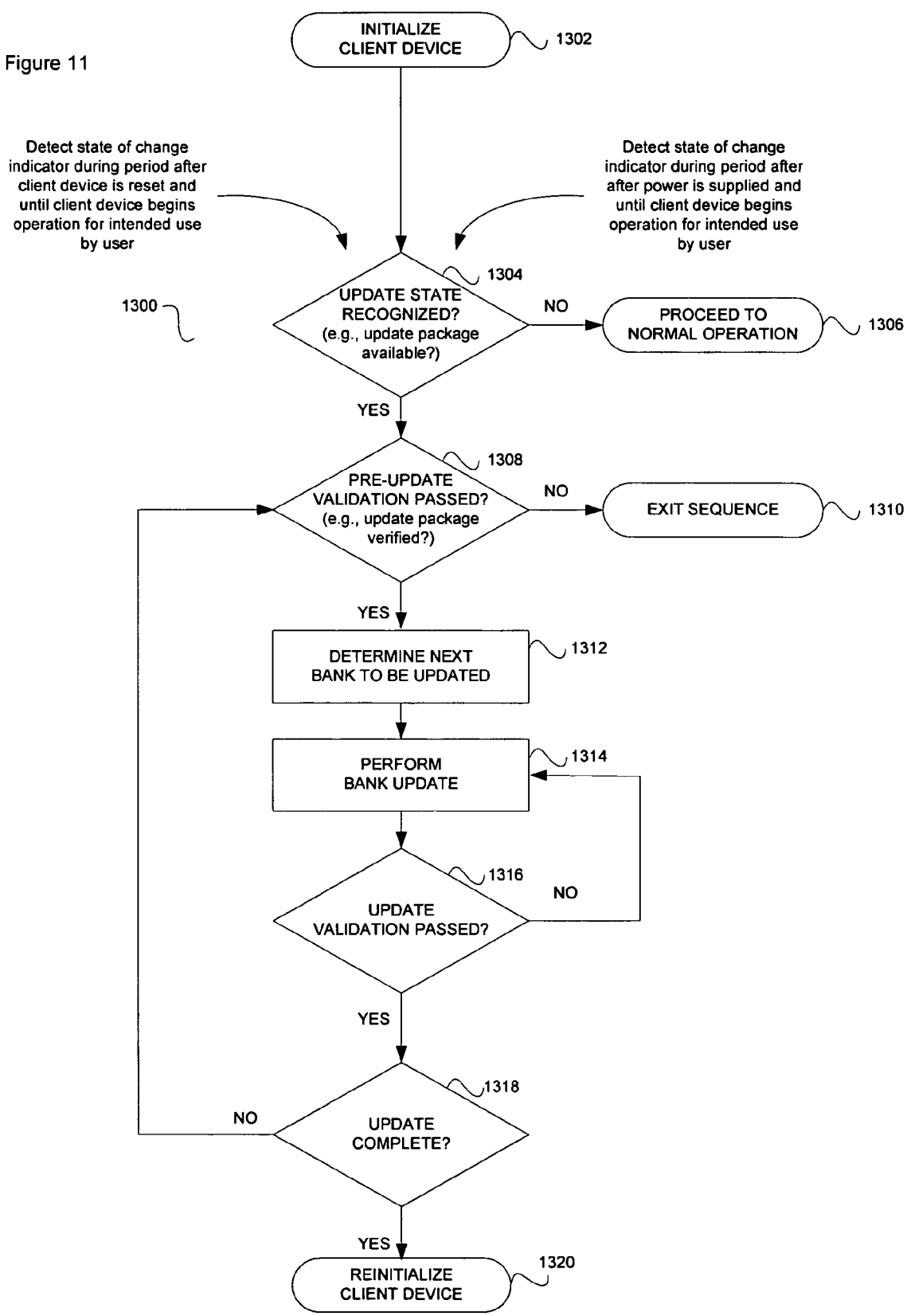
FIG. 11 is a flowchart illustrating one embodiment of a fault tolerance process.

As previously indicated, in order to provide a sufficient level of fault tolerance the update server and processes include the ability to efficiently respond to unexpected hardware or software interruptions or failures. FIG. 11 illustrates one embodiment of a fault tolerance process 1300 used by the update agent 1025 of the client device 104 to ensure proper installation of the instruction set contained in the update package 110. The instruction set provides an efficient conversion method or instruction sequence that is capable of installing the newer code version into a computing device, such as the client device 104, to replace the existing code version. In one aspect, the fault tolerance process 1300 comprises a series of checks or validations that advantageously protect the existing code version that is used by the client device 104, to avoid corruption during execution of the instructions contained in the update package 110. Furthermore, the fault tolerance process 1300 insures that the information contained in the updated code accurately reflects the desired information to insure proper device operation after the update. The following description of the fault tolerant sequence identifies the distinguishing characteristics of this process as it relates to the processing of update instructions by the update server 1025. It will be appreciated that this process operates in conjunction with the aforementioned update process described in detail in connection with FIGS. 9 and 10. As such, the fault tolerant sequence may be considered an integral part of the update process and portions of this process may have coordinative functionality with the aforementioned update processes.

Upon initialization of the client device 104 in a start state 1302, the fault tolerance process 1300 advances to a state 1304, where the update agent 1025 checks the status table for a "not idle" state recognition. The "not idle" state signifies that the client device 104 is in the update processing mode where the instructions of the update package 1025 will be applied to generate the new code version. If the update processing mode is not recognized, then the fault tolerance sequence terminates in an end state 1306 and the device continues to operate in a normal mode of operation without further update processing. Otherwise, if the update processing mode is recognized, then the fault tolerance process 1300 advances to a validation state 1308. In the validation state 1308, the update agent 1025 performs one or more confirmation operations or checks including verification of the saved update package 110 that has been stored in non-volatile memory, identification of the starting address and contents of the working bank, and the starting address and contents of the backup bank.

In the state 1308, if the update agent 1025 determines that the pre-update validation fails, then the update and fault tolerance processes are terminated in state 1310. Alternatively, if the update agent 1025 is able to validate the status table information in the state 1308, then the fault tolerance process 1300 advances to a state 1312, where the update agent 1025 determines the next bank to be updated.

Figure 13:
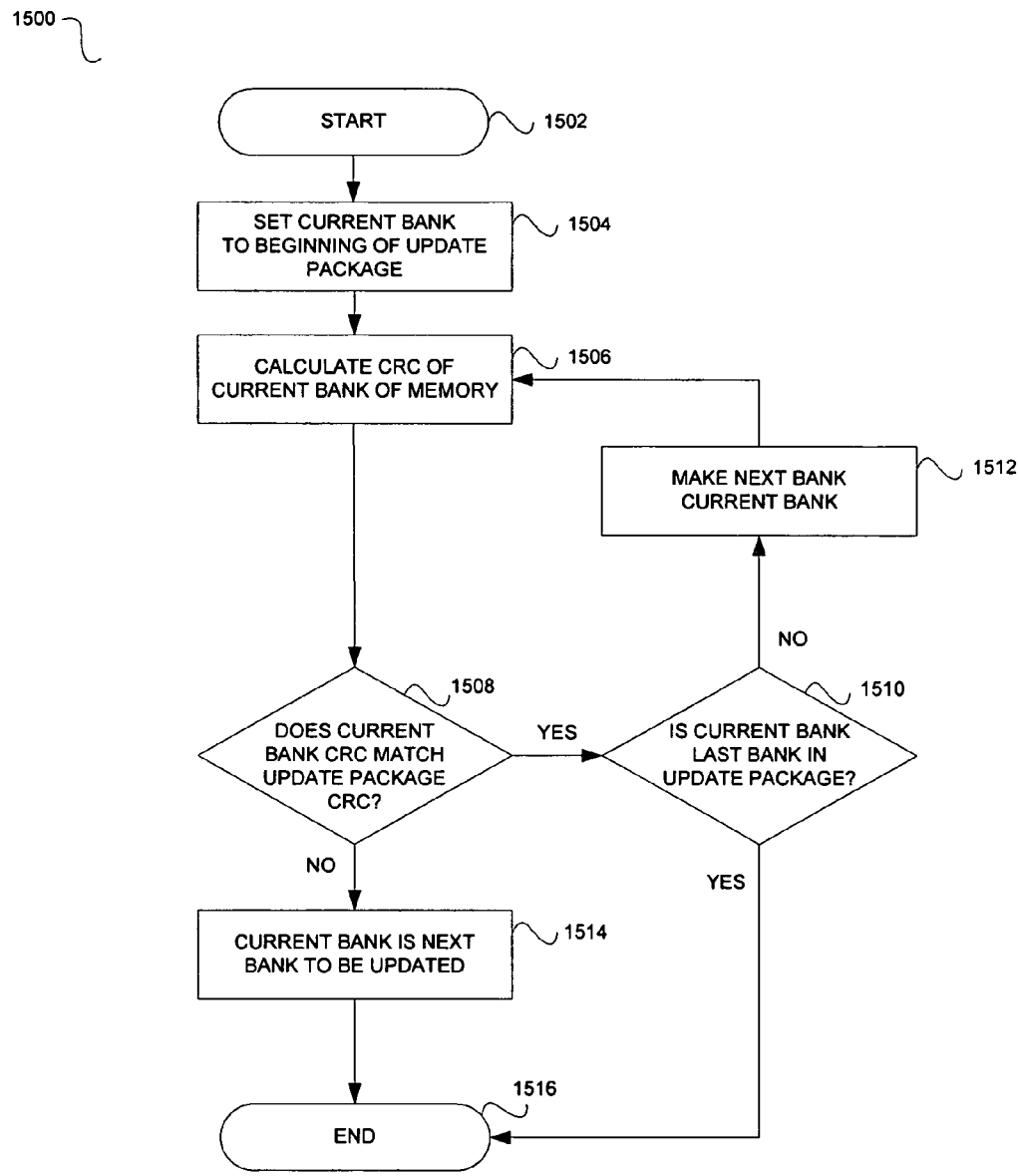
FIG. 13 shows a block diagram illustrating an exemplary method of determining the next bank to be updated that may correspond to the actions of state 1312 of FIG. 11, in accordance with an embodiment of the present invention.

In state 1312, the update agent checks the bank identity information from the uncompressed update package and finds out where the update process was terminated and should be resumed. The reader is now directed to FIG. 13, that shows a block diagram illustrating an exemplary method 1500 of determining the next bank to be updated, that may correspond to the actions of state 1312 of FIG. 11, in accordance with an embodiment of the present invention. The point at which to resume the update process is found, for example, by comparing size and CRC information from bank identity information with the existing and updated bank information calculated from the physical banks inside the electronic device (state 1508). In one aspect, the process determines the appropriate resume point by comparing the bank size and CRC information. Proceeding sequentially from the beginning of the update package instruction set (states 1502, 1504, 1506, 1508, 1510, 1512), a bank which does not match the expected size and CRC information, is the first bank to be updated (states 1514, 1516). Additionally, if the update process is interrupted during a bank copy function, for example when copying updated bank information back into the existing bank of non-volatile memory 1002, and the size and/or CRC information does not match the expected values then the backup bank may be used to recover the last updated bank.

The update agent 1025 then performs the bank update in state 1314 as previously described. Next, in a state 1316, a series of update validations are applied to determine if the bank update was successful. In one aspect, the update agent 1025 may accomplish bank validation by checking bank description information, which includes bank identity information and CRC values corresponding to the old information contained in the bank and newly updated information. Additionally the validation task may assess old and new file or bank sizes to determine if these values match expected values. In addition, the update agent 1025 may compare actual bank description information to bank description information stored in the update package 110.

If one or more of the update validations fail, such as the CRC codes fail to match, then the fault tolerance process 1300 loops back to perform the bank update again in the state 1314. If the update validations pass in state 1316, then the fault tolerance process 1300 advances to a state 1318, where the update agent determines if the update installation is complete. The update agent 1025 may accomplish this task by re-checking the bank description information, CRC or size values of the previous banks to validate proper update installation for each of the previous banks. Additionally, the update agent 1025 may use a counter or a pointer to determine the bank position, which is used to determine if the update installation is complete. If the update installation is not complete, then the fault tolerance process 1300 loops back to the state 1312 to determine the next bank to be updated. Alternatively, if the update installation is complete, then the fault tolerance process 1300 terminates in an end state 1320 by re-initializing the client device 104. Furthermore, when the update operation is determined to be complete, the "not idle" state is returned to an "idle" state, which changes the state of device operation from the update processing mode of operation to the normal operational mode upon reset or re-initialization of the client device 104.

Advantageously, the above-mentioned fault tolerance process 1300 is used to protect the operational software or firmware code against unforeseen failure, such as a power failure or data corruption. When a power failure occurs in the installation process, the update agent 1025 is able to determine the banks that have been updated, the next bank to be updated, and when the update installation is complete. Furthermore, the fault tolerance process 1300 efficiently and reliably protects the bank update installation and conversion process against hardware or software interruptions, power failures, data corruption, and/or other catastrophic encounters beyond the control of the user.

Figure 12:
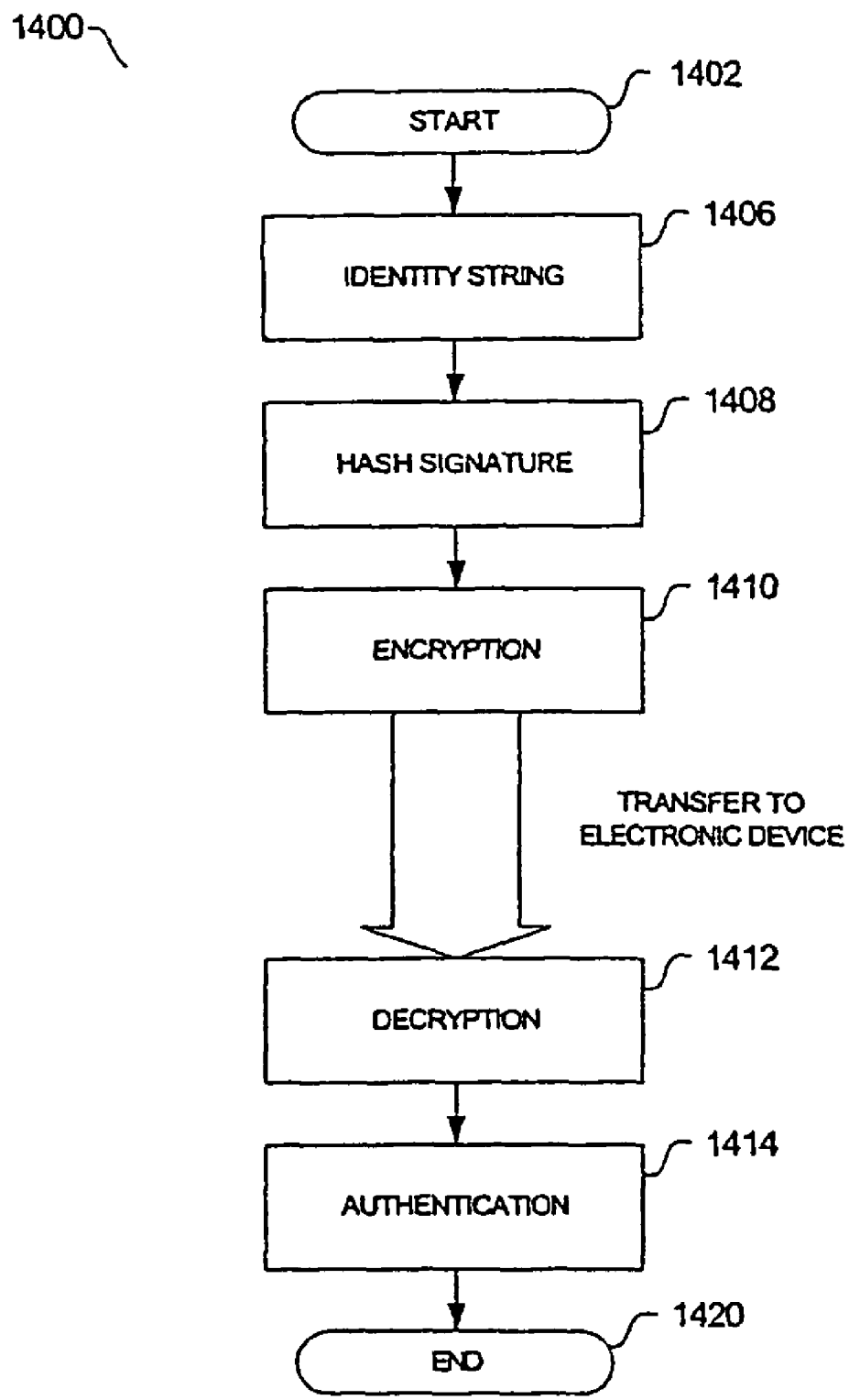
FIG. 12 is a flowchart illustrating one embodiment of a signature creation and authentication process.

FIG. 12 illustrates one embodiment of a signature creation and authentication process 1400, which is used for security and validation purposes. In one embodiment, the update package 110 is transferred from the update device server 102 via a communications medium in a manner so as to securely manage the digital information sequences, protect client privacy, and reduce the probability of data corruption. Implementation of the signature creation and authentication process 1400 in a start state 1402 and proceeds to a state 1406, where a digital signature or identity string is designated for the electronic device. The digital signature comprises information used to validate the source of the transferred data and confirm that the data is designed for use with the present electronic device. In one embodiment the digital signature comprises a manufacturer designated information string that is used to authenticate the source of the update package 110. Additionally, as shown in state 1408, a signature or hash value may be generated using a known MD5 algorithm. The MD5 algorithm generates the hash value of a source file, for example from the device update information, which is desirably included along with the update package 110 for subsequent validation after transfer of the update package to the electronic device.

In one aspect, the hash value determined by the MD5 algorithm is used to form a digital fingerprint of the device update information. As with a human fingerprint, the hash value is unique and no two sets of device update information (contain information differences with respect to one another) will have the same digital signature. This uniqueness enables the hash value to act as a fingerprint of the original information or instruction set, and enables the use of the MD5 technology for purposes of maintaining data integrity and comparison validation. For example, when downloading or receiving an update package over a communications medium, the MD5 technology may be used to substantially guarantee that the downloaded update package is the correct, unaltered data file by comparing the calculated MD5 signature or hash value with the MD5 signature contained in the update package, to thereby verify the integrity of the data file. Thus the information or data of the update package 110 may incorporate the use of MD5 technology or similar digital image signature methodology to ensure integrity of the information transmitted in the update package 110.

Next, in a state 1410, the MD5 hash value and digital signature are encrypted and included in the update package 110. In one aspect, the encryption process is used to achieve a higher degree of data security. To read or access an encrypted hash value and digital signature, the electronic device must possess or have access to a key or password that enables decryption or the deciphering of the encoded data. Both asymmetric encryption techniques (for example public-key encryption) and symmetric encryption techniques may be used to encrypt the update package 110. In one embodiment, RSA encryption or a public-key encryption techniques are used to encrypt the hash value and digital signature prior to distribution.

Following encryption in state 1410, the update package is ready for distribution to the client devices and upon receiving the update package 110 the client device continues with the authentication process in state 1412. When the client device 104 receives the update package the encrypted portion of the package is decrypted and to resolve the digital signature, and hash value into separate components. At this point, the process 1400 advances to a state 1414, where the update agent 1025 authenticates the MD5 hash value and digital signature information. In one aspect, the transferred MD5 hash value is compared to a calculated MD5 hash value. If the two values are identical then the update package and its contents are authentic and the update process may continue. Otherwise, if the authentication fails then the update package may be discarded as non-authentic. Similarly, if the digital signature matches an expected digital signature previously stored in the electronic device then the received update package 110 is determined to be authentic. Once the received update package 110 is authenticated in the state 1418, the signature creation and authentication process 1400 is terminated in an end state 1420 and the update package 110 may be processed by the update agent 1025.

The aforementioned encryption scheme is useful in maintaining the privacy of the digital information contained in the update package 110 and transferred through the communications medium. Security and privacy protection is a significant concern among individuals using all types of communications media, including wireless networks and the Internet. Therefore, the signature creation and authentication process 1400 is a useful method for insuring security in the update procedure and increases the reliability of receiving the actual update information in a complete and untampered package. Once authenticated, the client device may then proceed to install the update package 110, which converts the older code version of firmware or operational software to the newer code version of firmware or operational software.

One desirable feature of the present invention is that it may be adapted to many different memory and storage architectures without the need for modification of the hardware of the electronic device. The update system may therefore be incorporated into existing electronic devices, as well as, adapted to the design of future devices to provide a more efficient and less cumbersome update path as compared to prior art solutions. Additionally, numerous methods of distributing the update package can be accomplished using the update management system and methods. It is conceived that the present invention may be used in conjunction with many different types of communications media to distribute the update package to the electronic devices to be updated. Using both wireless and wired networks as well as Internet connected networks, the update packages may be distributed to the electronic devices permitting them to be frequently updated in a convenient manner. The flexible distribution over these communications media also allows the updates to be distributed to large numbers of electronic devices with minimal user interaction and inconvenience.

In one aspect the update management system and methods can be used to substantially alter the functionality of the electronic device applying the update package. For example, the resident operating code or application stored in the device may convey a first device functionality the is desirably altered to updated operating code or a new application that conveys a second device functionality. In this example, the first and second devices functionalities may be representative of software applications such as games, address books, calculators, personal reminders or other data/information/applications. Upon updating the operating code, the device functionality may be substantially altered to transform the first device functionality into the second device functionality. For example, if the first device functionality is a game, the update package may be used to transform the digital information sequences representative of the game into another device functionality such as a calculator. Additionally, the first device functionality can be updated from a previous version to a newer version having a similar functionality reflected by the second device functionality. For example, if the first device functionality was a 9 function calculator application, this application could be updated to a 26 function calculator application by applying a suitable update package.

It will be appreciated that the update management system and methods can desirably used in connection with software applications and device drivers such as those used in personal computers to provide a flexible means for updating the code of the software application or device drivers from one version to another. In one aspect, the aforementioned "words" representing digital information sequences used during the update process may be representative of files associated with software application or device drivers. During updating one or more files of the software application or device drivers may be updated providing a simplified method for maintaining the code present on the personal computer.

Additionally, as shown in the example above, the software application or device driver can be updated to maintain a consistent functionality from one version to the next or the functionality may be completely altered as needed or desired. For example, if the software application to be updated comprises a word processor, this application can be updated from a previous version to a new version to provide increased features and options as well as remove bugs and provide added capabilities. Alternatively, the application can be updated to a completely different application such as, for example, a spreadsheet or database program by applying the update package. It will be appreciated that updating in this manner provides a highly flexible means to alter the functionality of the software application that is not limited to exclusively changing between versions of the same application but instead can provide completely different applications and functionalities using a relatively small update package.

Another feature arising from the use of the updating system and method is that software installation, maintenance, and administration is greatly facilitated. A limitation of conventional systems results from users having to install and uninstall software applications manually in a series of steps that is error-prone and time consuming. The update management system, however, overcomes this limitation by providing for an automated installation process that may be used to install, remove, update, and change software applications from one to another by the relatively simple process of applying the update package. Thus, a new and more powerful manner of system administration can be realized allowing for automated management of one or more systems either locally (by application of the update package contained for example on a CDROM disk or removable storage medium) or remotely (by application of the update package through a wired or wireless communications medium). System administration in this manner provides for increased security, fault-tolerance, and flexibility over conventional methods and is less error prone and more rapid.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

What is claimed is:

1. A system for updating a plurality of distributed electronic devices with an updated operating code comprising a first plurality of digital information sequences wherein each of the plurality of electronic devices include a resident operating code comprising a second plurality of digital information sequences that are stored within the electronic device, the system comprising:

an update generator that compares an image of the first plurality of digital information sequences comprising the updated operating code to an image of the second plurality of digital information sequences comprising the resident operating code and identifies differences between the updated operating code and the resident operating code and thereafter generates an update package comprising an instruction set which specifies how to generate the updated operating code utilizing at least a portion of the second plurality of digital information sequences of the resident operating code, wherein the image is a representation of the contents of a storage area to be updated including operating system code, application code, firmware contents, or other instruction sets used by the electronic devices to convey functionality;

a distribution system that distributes the update package to the electronic devices such that the update package is received by the electronic devices and stored therein; and a plurality of client modules that are respectively resident on each of the plurality of electronic devices, wherein the plurality of client modules access the distribution system and receive the update package and wherein the instruction set of the update package is executed by the client modules so as to generate the updated operating code by utilizing a least a portion of the second plurality of digital information sequences from the resident operating code.

2. The system of claim 1, wherein the image of the updated operating code and the image of the resident operating code comprise substantially accurate representations of each respective code as it is stored in the electronic device such that information about the composition and position of the first and second plurality of digital information sequences is known by the update generator.

3. The system of claim 2, wherein the update generator uses the information about the composition and position of the second plurality of digital information sequences to generate the instruction set and wherein application of the instruction set to the image of the resident operating code results in its transformation into the image of the updated operating code.

4. The system of claim 1, wherein the identified differences between the updated operating code and the resident operating code are assessed in a code-independent manner by directly comparing the respective code images and identifying discretely sized information patterns between the updated operating code and the resident operating code.

5. The system of claim 4, wherein the discretely sized information patterns comprise information patterns that at least one byte in length.

6. The system of claim 4, wherein the discretely sized information patterns comprise information patterns that are at least one bit in length.

7. The system of claim 1, wherein the instruction set comprises a plurality of operations that access the second plurality of digital information sequences of the resident operating code and use these digital information sequences to generate at least a portion of the first plurality of digital information sequences by reusing and transforming the digital information sequences of the resident operating code into digital information sequences of the updated operating code.

8. The system of claim 1, wherein use of the instruction set reduces the size of the update package required to transform the resident operating code into the updated operating code by specifying operations which preferentially reuse the resident operating code present within the electronic device such that the size of the instruction set to be used in the update package is smaller than the size of the corresponding bit patterns used to transform the resident operating code into the updated operating code.

9. The system of claim 1, wherein the digital information sequences comprise bit-wise patterns of information.

10. The system of claim 1, wherein the update package is distributed by establishing a communication link between the distribution system and the electronic device over a communications medium.

11. The system of claim 10, wherein the communications medium comprises a wireless network.

12. The system of claim 10, wherein the communications medium comprises a wired network.

13. The system of claim 10, wherein the communications medium comprises Internet-connected communications medium.

14. The system of claim 1, wherein the plurality of distributed electronic devices comprise wireless devices selected from the group consisting essentially of:
mobile phones, cellular phones, personal digitals assistants, pagers, satellites, laptop computers, notebook computers and telematic devices.

15. The system of claim 1, wherein the plurality of distributed electronic devices comprise electronic devices selected from the group consisting essentially of:
personal computers, server computers, desktop computers and telematic devices.

16. The system of claim 1, wherein the resident and updated operating code comprise instructions and information that form the operating system for the electronic devices.

17. The system of claim 1, wherein the resident and updated operating code comprises a first collection of personalized information stored in the electronic device that is updated to transform the first collection of personalized information into a second collection of personalized information.

18. The system of claim 17, wherein the first and second collections of personalized information comprise names, addresses, phone numbers, maps, directions and other types of personalized information.

19. The system of claim 1, wherein the resident operating code comprise a first version of a software program and the updated operating code comprises a second version of the software program.

20. A system for updating an electronic device containing a first plurality of data sequences comprising a first code version to a second code version comprising a second plurality of data sequences using a update package comprising a plurality of transformation instructions which transform the first code version into the second code version, the system comprising:
an update generator that performs a version comparison between the first code version and the second code version to identify pattern differences between the first plurality of data sequences and the second plurality of data sequences, wherein the identified pattern differences are encoded using the transformation instructions which identify portions of the first plurality of data sequences that can be used in the construction of the identified pattern differences, and thereafter forming the update package using the transformation instructions, wherein the transformation instructions of the update package are selected by evaluating an efficiency of applying one or more comparison functions to resolve the identified pattern differences in order to convert the first code version to the second code version;
a distribution system that receives the update package from the update generator and distributes the update package to the electronic device; and
an update agent resident on the electronic device that executes the transformation instructions of the update package thereby transforming the first code version resident in the electronic device into the updated second code version.

21. The system of claim 20, wherein the efficiency of the comparison functions are based upon the resulting size of the transformation instruction compared to the size of the pattern difference to which the transformation instruction applies.

22. The system of claim 20, wherein the transformation instruction with the highest efficiency is selected by the update generator for incorporation in the update package.

23. The system of claim 20, wherein the first and second code versions comprise instructions and information that form the operating system for the electronic device.

24. The system of claim 20, wherein the first code version comprises a first collection of information stored in the electronic device that is updated to transform the first collection of information into a second collection of information represented in the second code version.

25. The system of claim 24, wherein the first and second collections of information comprise names, addresses, phone numbers, maps, directions and other types of personalized information.

26. The system of claim 20, wherein the first code version is a software program and the second code version comprises an updated version of the software program.

27. A system for updating a plurality of distributed electronic devices with an updated operating code that comprises a plurality of data blocks wherein each of the plurality of distributed electronic devices include a resident operating code that is stored as a plurality of data blocks, the system comprising:

an update generator that compares the plurality of data blocks of the resident operating code with the plurality of data blocks of the updated operating code and thereby generates an update package comprising an instruction set which indicates how to generate the updated operating code utilizing at least in part the plurality of data blocks of the resident operating code;
wherein the update generator compares the plurality of data blocks of the resident operating code and the plurality of data blocks of the updated operating code and identifies sequence differences between the operating codes; and
wherein the update generator forms the instruction set to efficiently transform the sequence differences between the operating codes using portions of the data blocks comprising the resident operating code to thereby reduce the size of the update package compared to directly including the sequence differences in the update package;
a distribution system that includes the update package and is accessible by each of the plurality of distributed electronic devices; and
a plurality of client modules that are respectively resident on each of the plurality of distributed electronic devices, wherein the plurality of client modules accesses the distribution system so as to be able to receive the update package, wherein the instruction set provides instructions to the client modules such that the client modules generates at least a portion of the plurality of data blocks comprising the updated operating code by utilizing the plurality of data blocks comprising the resident operating code.

28. The system of claim 27, wherein the sequence differences comprise bit-wise differences.

29. The system of claim 27, wherein the sequence differences comprise byte-wise differences.

30. The system of claim 27, wherein the distribution system and the plurality of distributed electronic devices exchange information over a communications medium.

31. The system of claim 30, wherein at least part of the information exchanged by the distribution system and the plurality of distributed electronic devices comprises the update package.

32. The system of claim 30, wherein the communications medium comprises a wireless network.

33. The system of claim 30, wherein the communications medium comprises a wired network.

34. The system of claim 30, wherein the communications medium comprises Internet-connected communications medium.

35. The system of claim 27, wherein the plurality of distributed electronic devices comprise wireless devices selected from the group consisting essentially of: mobile phones, cellular phones, personal digital assistants, pagers, satellites, laptop computers, notebook computers and telematic devices.

36. The system of claim 27, wherein the plurality of distributed electronic devices comprise electronic devices selected from the group consisting essentially of: personal computers, server computers, desktop computers and telematic devices.

37. The system of claim 27, wherein the resident and updated operating code comprises instructions and information that form the operating system for the electronic devices.

38. The system of claim 27, wherein the resident and updated operating code comprises a first collection of personalized information stored in the electronic device that is updated to transform the first collection of personalized information into a second collection of personalized information.

39. The system of claim 38, wherein the first and second collections of personalized information comprise names, addresses, phone numbers, maps, directions and other types of personalized information.

40. The system of claim 27, wherein the resident operating code comprises a first version of a software program and the updated operating code comprises a second version of the software program.

41. The system of claim 27, wherein the resident operating code conveys a first functionality to the electronic device and the updated operating code conveys a second functionality to the electronic device.

42. The system of claim 41, wherein the first functionality and the second functionality are the same functional species or application type.

43. The system of claim 41, wherein the first functionality and the second functionality are different functional species or application types.

44. The system of claim 41, wherein the resident operating code and the updated operating code comprise different versions of the operating code.

45. The system of claim 27, wherein the resident operating code comprises a first version of firmware and the updated operating code comprises a second version of firmware.

46. A system for updating a plurality of distributed electronic devices with an updated operating code that comprises a plurality of data blocks wherein each of the plurality of distributed electronic devices include a resident operating code that is stored as a plurality of data blocks, the system comprising:
an update generator that operates in a code-independent manner and not at an instructional level using simulated representations of a storage area to be updated, the update generator comparing the plurality of data blocks of the resident operating code with the plurality of data blocks of the updated operating code and thereby identifies update data blocks that are different between the updated operating code and the resident operating code wherein the update generator generates an update package comprising an instruction set which indicates how to transform the resident operating code into the updated operating code and how to generate the update data blocks utilizing at least in part the plurality of data blocks of the resident operating code;
a distribution system that includes the update package and is accessible by each of the plurality of distributed electronic devices; and
a plurality of client modules that are respectively resident on each of the plurality of distributed electronic devices, wherein the plurality of client modules accesses the distribution system so as to be able to receive the update package, wherein the instruction set provides instructions to the client modules such that the client modules modifies the resident operating code into the updated operating code and wherein the client modules generates at least a portion of the update data blocks by utilizing the received instruction set to perform operations on the data blocks of the resident operating code to generate the update data blocks.

47. The system of claim 46, wherein the identified pattern differences between the first code version and the second code version have a discretely identifiable word size.

48. The system of claim 47, wherein the word size of the pattern differences comprises at least one bit.

49. The system of claim 47, wherein the word size of the pattern differences comprises at least one byte.

50. The system of claim 47, wherein the update generator forms the transformation instructions which define how to convert the pattern differences between the first code version and second code version using a least a portion of the first code version which is transformed into the second code version.

51. The system of claim 46, wherein the distribution system and the plurality of distributed electronic devices exchange information over a communications medium.

52. The system of claim 51, wherein at least part of the information exchanged by the distribution system and the plurality of distributed electronic devices comprises the update package.

53. The system of claim 51, wherein the communications medium comprises a wireless network.

54. The system of claim 51, wherein the communications medium comprises a wired network.

55. The system of claim 51, wherein the communications medium is selected from the group consisting essentially of: Internet-connected communications mediums, local area networks (LANs), wide area networks (WANs), public Internets, private Internets, private computer networks, secure Internets, private networks, public networks, value-added networks, and interactive television networks, wireless data transmission networks, two-way cable networks, interactive kiosk networks.

56. The system of claim 46, wherein the electronic device comprises a wireless device selected from the group consisting essentially of: mobile phones, cellular phones, personal digital assistants, pagers, satellites, laptop computers, notebook computers, and telematic devices.

57. The system of claim 46, wherein the electronic device comprises a device selected from the group consisting essentially of: personal computers, desktop computers, server computers and telematic devices.

58. The system of claim 46, wherein the resident and updated operating code comprise instructions and information that form the operating system for the electronic device.

59. The system of claim 46, wherein the resident operating code comprises a first collection of information stored in the electronic device that is updated to transform the first collection of information into a second collection of information represented by the updated operating code.

60. The system of claim 59, wherein the first and second collections of information comprise names, addresses, phone numbers, maps, directions and other types of personalized information.

61. The system of claim 46, wherein the resident operating code comprises a first version of a software program and the updated operating code comprises a second version of the software program.

62. The system of claim 46, wherein the resident operating code conveys a first functionality to the plurality of electronic devices and the updated operating code conveys a second functionality to the plurality of electronic devices.

63. The system of claim 62, wherein the first functionality and the second functionality are the same.

64. The system of claim 62, wherein the first functionality and the second functionality are substantially different in nature.

65. The system of claim 46, wherein the resident operating code comprises a first version of firmware and the updated operating code comprises a second version of firmware.

66. A method of updating a resident operating code stored in a first storage section of an electronic device into an updated operating code, the method comprising:
 (i) developing an update package comprising a plurality of transformation operations to transform the resident operating code into the updated operating code, wherein developing the update package further comprises:
  assessing the efficiency of one of more different transformation operations to transform the resident operating code into the updated operating code; and
  selecting transformation operations that increase the utilization of resident operation code to generate the updated operating code to thereby reduce the size of the update package;
 (ii) transferring the update package to the electronic device;
 (iii) copying a portion of the resident operating code into a second storage section;
 (iv) updating the portion of the resident operating code stored in the second storage section using the transformation operations of the update package to transform the resident operating code into updated operating code;
 (v) replacing the portion of resident operating code stored in the first storage section with the portion of updated operating code stored in the second storage section; and
 (vi) repeating acts (iii) through (v) until the resident operating code has been fully updated to the updated operating code.

67. The method of claim 66, wherein updating the portion of resident operating code stored in the second storage section comprises applying the transformation operations which utilize at least some of the resident operating code stored in the first storage section to transform the portion of resident operating code stored in the second storage section into the portion of updated operating code.

68. The method of claim 67, wherein updating the portion of the resident operating code further comprises replacing portions of the resident operating code stored in the first storage section by copying the updated operating code stored in the second storage section in place of portions of the resident operating code.

69. The method of claim 66, wherein developing the update package comprises generating a hash table containing one or more addresses representative of locations within the first storage section that contain resident operating code sequences that may be used to form the updated operating code by application of the transformation operations.

70. The method of claim 69, wherein the updated operating code is generated by retrieving the resident operating code sequence corresponding to one or more particular addresses specified in the hash table and applying the transformation operation to the retrieved resident operating code sequence thereby transforming the resident operating code sequence into an updated operating code sequence.

71. The method of claim 66, wherein transferring the update package to the electronic device comprises sending the update package over a wireless communications medium.

72. The method of claim 66, wherein transferring the update package to the electronic device comprises sending the update package over a communications medium selected from the group consisting essentially of: Internet-connected communications mediums, local area networks (LANs), wide area networks (WANs), public Internets, private Internets, private computer networks, secure Internets, private networks, public networks, value-added networks, interactive television networks, wireless data transmission networks, two-way cable networks, and interactive kiosk networks.

73. The method of claim 66, wherein updating the resident operating code stored in a first storage section comprises updating operating code stored in a non-volatile storage media.

74. The method of claim 73, wherein updating operating code stored in the non-volatile storage media comprises updating operating code stored in a flash memory storage medium.

75. The method of claim 73, wherein updating operating code stored in a non-volatile storage media comprises updating operating code stored in a storage medium selected from the group consisting essentially of hard drives, optical drives, tape drives, and EPROM devices.

76. The method of claim 66, wherein copying the portion of the resident operating code into a second storage section comprises copying the portion of the resident operating code into a volatile storage media.

77. The method of claim 76, wherein copying the portion of the resident operating code into a volatile storage media comprises copying the portion of resident operating code into a random access memory storage medium.

78. The method of claim 66, wherein updating the resident operating code stored in a first storage section comprises updating the resident operating code stored in subdivisions of the first storage section comprising a plurality of banks which contain the resident operating code.

79. The method of claim 78, wherein the portion of resident operating code copied into the second storage section corresponds to the resident operating code present in one or more banks from the first storage section.

80. The method of claim 78, wherein the transformation operations transform the resident operating code present in one or more banks of the first storage section into updated operating code.

81. The method of claim 66, wherein the resident and updated operating code comprise instructions and information that form the operating system for the electronic device.

82. The method of claim 66, wherein the resident and updated operating code comprises a first collection of information stored in the electronic device that is updated to transform the first collection of information into a second collection of information.

83. The method of claim 82, wherein the first and second collections of information comprise names, addresses, phone numbers, maps, directions and other types of information.

84. The method of claim 66, wherein the resident operating code comprises a first version of a software program and the updated operating code comprises a second version of the software program.

85. The method of claim 66, wherein the resident operating code conveys a first functionality to the electronic device and the updated operating code conveys a second functionality to the electronic device.

86. The method of claim 85, wherein the first functionality and the second functionality are selected from the same functional species or application type.

87. The method of claim 85, wherein the first functionality and the second functionality are selected from different functional species or application types.

88. The method of claim 66, wherein the resident operating code comprises a first version of firmware and the updated operating code comprises a second version of firmware.

89. The method of claim 66, further comprising forming a copy of the downloaded update package in the first storage section prior to performing the transformation operations such that a non-volatile copy of the update package is available in the event of power failure or corruption during the update process.

90. The method of claim 66, further comprising forming a copy of the updated resident operating code section in the first storage section prior to replacing the original operating code section such that a non-volatile copy of the updated resident operating code section is available in the event of power failure or corruption during the update process.

91. An updatable electronic device comprising:
a non-volatile storage section having operating code stored therein;
a volatile storage section that is adapted to receive an update package comprising a plurality of instructions via a communications medium; and
a controller that implements the instructions of the update package to update the operating code stored in the non-volatile storage section wherein the controller is configured to, based on comparison of an image representing but not being a current code version, sequentially (i) retrieve original portions of operating code from the non-volatile storage section into the volatile storage section and (ii) apply the instructions of the update package to the retrieved portions in the volatile storage section to thereby transform the retrieved original operating code portion into an updated operating code portion and then (iii) replace the original operating code portion with the updated operating code portion.

92. The updatable electronic device of claim 91, wherein the non-volatile storage section comprises flash memory storage medium.

93. The updatable electronic device of claim 91, wherein the non-volatile storage section comprises a storage medium selected from the group consisting essentially of: hard drives, optical drives, tape drives, and EPROM devices.

94. The updatable electronic device of claim 91, wherein the volatile storage section comprises a random access memory storage medium.

95. The updatable electronic device of claim 91, wherein the communications medium comprises a wireless communications medium.

96. The updatable electronic device of claim 91, wherein the communications medium comprises a wired communications medium.

97. The updatable electronic device of claim 91, wherein the communications medium is selected from the group consisting essentially of: an Internet-connected communications medium, local area networks (LANs), wide area networks (WANs), public Internets, private Internets, private computer networks, secure Internets, private networks, public networks, value-added networks, interactive television networks, wireless data transmission networks, two-way cable networks, and interactive kiosk networks.

98. The updatable electronic device of claim 91, wherein the non-volatile storage section is subdivided into a plurality of banks which contain the resident operating code.

99. The updatable electronic device of claim 98, wherein the portion of resident operating code retrieved into the volatile storage section corresponds to the resident operating code present in the one or more banks from the non-volatile storage section.

100. The updatable electronic device of claim 98, wherein the instructions transform the resident operating code present in one or more banks of the non-volatile storage section into updated operating code.

101. The updatable electronic device of claim 91, wherein the controller implements the instructions of the update package in a fault tolerant manner such that the updateable electronic device is protected from corruption of the resident operating code or the updated operating code.

102. The updatable electronic device of claim 91, wherein one or more backup copies of the update package are maintained in the non-volatile storage section such that the update package is not lost as a result of power interruption or device fault.

103. The updatable electronic device of claim 102, wherein upon power interruption or device fault the controller restores information contained in the one or more backup copies of the update package and resumes updating at a point corresponding to a detected successfully completed operation before the power interruption occurred.

104. The updatable electronic device of claim 103, wherein the controller detects successfully competed operations using error correction codes or CRC codes to evaluate the resident and updated operating code and determine the progress of update installation.

105. The updatable electronic device of claim 91, wherein one or more backup copies of the updated operating code are maintained in the non-volatile storage section such that the updated operating code is not lost as a result of power interruption or device fault.

106. The updatable electronic device of claim 105, wherein upon power interruption or device fault the controller restores information contained in the one or more backup copies of the updated operating code and resumes updating at a point corresponding to a detected successfully completed operation before the power interruption occurred.

107. The updatable electronic device of claim 106, wherein the controller detects successfully completed operations using error correction codes or CRC codes to evaluate the resident and updated operating code and determine the progress of update installation.

108. The updatable electronic device of claim 91, wherein one or more backup copies of the resident operating code are maintained in the non-volatile storage section such that the resident operating code is not lost as a result of power interruption or device fault.

109. The updatable electronic device of claim 108, wherein upon power interruption or device fault the controller restores information contained in the one or more backup copies of the resident operating code and resumes updating at a point corresponding to a detected successfully completed operation before the power interruption occurred.

110. The updateable electronic device of claim 109, wherein the controller detects successfully completed operations using error correction codes or CRC codes to evaluate the resident and updated operating code and determine the progress of update installation.

111. The updatable electronic device of claim 91, wherein the original and updated operating code comprise instructions and information that form the operating system for the electronic device.

112. The updatable electronic device of claim 91, wherein the original operating code comprises a first collection of information stored in the electronic device that is updated to transform the first collection of information into a second collection of information represented by the updated operating code.

113. The updatable electronic device of claim 112, wherein the first and second collections of information comprise names, addresses, phone numbers, maps, directions and other types of personalized information.

114. The updatable electronic device of claim 91, wherein the original operating code comprises a first version of a software program and the updated operating code comprises a second version of the software program.

115. The updatable electronic device of claim 91, wherein the original operating code conveys a first functionality to the electronic device and the updated operating code conveys a second functionality to the electronic device.

116. The updatable electronic device of claim 115, wherein the first functionality and the second functionality are the same.

117. The updatable electronic device of claim 115, wherein the first functionality and the second functionality are substantially different in nature.

118. The updatable electronic device of claim 91, wherein the original operating code comprises a first version of firmware and the updated operating code comprises a second version of firmware.

119. A method for remotely managing update of firmware or software in a wireless device over a network comprising at least one server having an update management component, and the wireless device, the method comprising:
 under coordination of the update management component, establishing communication between the at least one server and the wireless device via wireless means;
 receiving, from the at least one server via the wireless means, a command to update firmware or software in the wireless device; and
 executing the received command, wherein execution of the command performs specific operations related to downloading and installing update information at the wireless device, after verifying that the command can be executed, based on an image representation of contents of memory or storage area in the wireless device, the contents represented in the image comprising the operating system code, application code, firmware contents, or other instruction sets used by the electronic device to convey functionality.

120. The method according to claim 119, further comprising:
 receiving update information at the wireless device via the wireless means, wherein the update information comprises at least one of the following: information to fix bugs in firmware or software of the wireless device, and information to upgrade functionality of the wireless device;
 entering an update state and updating the firmware or software using the update information;
 automatically returning to a normal operational state of the wireless device, if the updating is successful; and
 automatically maintaining the update state, if the updating is not successful.

121. The method according to claim 119, wherein the at least one server comprises an updating system, and wherein the method further comprises:
 receiving, from the updating system, update information associated with at least one of the following: firmware or software installation, maintenance, and administration of the wireless device; and
 conducting the at least one of the following: firmware or software installation, maintenance, and administration of the device, using the received update information.

* * * * *

UNITED STATES PATENT AND TRADEMARK OFFICE
CERTIFICATE OF CORRECTION

PATENT NO. : 7,805,719 B2
APPLICATION NO. : 11/335312
DATED : September 28, 2010
INVENTOR(S) : Patrick J. O'Neill It is certified that error appears in the above-identified patent and that said Letters Patent is hereby corrected as shown below:

In column 40, line 58, in Claim 1, delete "a least" and insert -- at least --, therefor.

In column 41, line 14, in Claim 5, after "that" insert -- are --.

In column 41, lines 49-54, in Claim 14, delete "The system of claim 1, wherein the plurality of distributed electronic devices comprise wireless devices selected from the group consisting essentially of:
    mobile phones, cellular phones, personal digitals assistants, pagers, satellites, laptop computers, notebook computers and telematic devices." and
insert -- The system of claim 1, wherein the plurality of distributed electronic devices comprise wireless devices selected from the group consisting essentially of: mobile phones, cellular phones, personal digitals assistants, pagers, satellites, laptop computers, notebook computers and telematic devices. --, therefor.

In column 41, lines 55-59, in Claim 15, delete "The system of claim 1, wherein the plurality of distributed electronic devices comprise electronic devices selected from the group consisting essentially of:
    personal computers, server computers, desktop computers and telematic devices." and
insert -- The system of claim 1, wherein the plurality of distributed electronic devices comprise electronic devices selected from the group consisting essentially of: personal computers, server computers, desktop computers and telematic devices. --, therefor.

In column 45, line 6, in Claim 50, delete "a least" and insert -- at least --, therefor.

In column 47, line 12, in Claim 75, delete "of" and insert -- of: --, therefor.

Signed and Sealed this
Nineteenth Day of April, 2011

David J. Kappos
*Director of the United States Patent and Trademark Office*